(12) United States Patent
Jeong et al.

(10) Patent No.: US 12,392,897 B2
(45) Date of Patent: Aug. 19, 2025

(54) LOCALIZATION METHODS AND ARCHITECTURES FOR A TRAILER OF AN AUTONOMOUS TRACTOR-TRAILER

(71) Applicant: Aurora Operations, Inc., Mountain View, CA (US)

(72) Inventors: Yekeun Jeong, Sunnyvale, CA (US); Abhay Vardhan, Redwood City, CA (US); Adam Richard Williams, San Francisco, CA (US)

(73) Assignee: Aurora Operations, Inc., Mountain View, CA (US)

( * ) Notice: Subject to any disclaimer, the term of this patent is extended or adjusted under 35 U.S.C. 154(b) by 1023 days.

(21) Appl. No.: 17/463,879

(22) Filed: Sep. 1, 2021

(65) Prior Publication Data
US 2023/0061950 A1    Mar. 2, 2023

(51) Int. Cl.
*G01C 3/08* (2006.01)
*B60W 60/00* (2020.01)
(Continued)

(52) U.S. Cl.
CPC .......... *G01S 17/32* (2013.01); *B60W 60/001* (2020.02); *G01S 17/58* (2013.01); *G05D 1/027* (2013.01);
(Continued)

(58) Field of Classification Search
CPC ...... G01S 17/32; G01S 17/58; B60W 60/001; B60W 2300/145; G05D 1/027; G05D 1/0272
See application file for complete search history.

(56) References Cited

U.S. PATENT DOCUMENTS

| 10,776,948 B1 | 9/2020 | Parisotto et al. |
| 11,656,629 B1 * | 5/2023 | Armstrong-Crews ...................... G01S 17/88 701/25 |

(Continued)

FOREIGN PATENT DOCUMENTS

| CN | 103777220 | 5/2014 | |
| CN | 1131588864 A * | 7/2021 | ............. G06V 10/44 |

(Continued)

OTHER PUBLICATIONS

Toledo et al.; Improving Odometric Accuracy for an Autonomous Electric Cart, MDPI, Jan. 12, 2018, 15 pages.

(Continued)

*Primary Examiner* — Mark Hellner
(74) *Attorney, Agent, or Firm* — Gray Ice Higdon

(57) ABSTRACT

Systems and methods for localization of a trailer of an autonomous tractor-trailer are described herein. Some implementations can determine a sector area in an environment of the autonomous tractor-trailer that is predicted to include the trailer, determine a subset of an LIDAR data that is generated by LIDAR sensor(s) of an autonomous tractor of the autonomous tractor-trailer and that is predicted to include the trailer based on the sector area, generate a trailer pose instance of a trailer pose of the trailer based on the subset of the LIDAR data, and cause the trailer pose instance to be utilized in controlling the autonomous tractor-trailer. Additional or alternative implementations can utilize particular LIDAR sensor(s) in generating the trailer pose instance, such as phase coherent LIDAR sensor(s) or polarized LIDAR sensor(s).

20 Claims, 8 Drawing Sheets

(51) Int. Cl.
  *G01S 17/32* (2020.01)
  *G01S 17/58* (2006.01)
  *G05D 1/00* (2006.01)

(52) U.S. Cl.
  CPC ..... *G05D 1/0272* (2013.01); *B60W 2300/145* (2013.01)

(56) References Cited

U.S. PATENT DOCUMENTS

| | | | |
|---|---|---|---|
| 11,987,287 B2* | 5/2024 | Ramirez Llanos | B62D 13/06 |
| 2019/0051056 A1 | 2/2019 | Chiu | |
| 2019/0138000 A1 | 5/2019 | Hammond et al. | |
| 2020/0004266 A1 | 1/2020 | Eoh | |
| 2020/0264258 A1 | 8/2020 | Zhang | |
| 2022/0214217 A1* | 7/2022 | Morelli | G01J 3/0208 |
| 2022/0410898 A1* | 12/2022 | Nett | G05D 1/2446 |

FOREIGN PATENT DOCUMENTS

| | | |
|---|---|---|
| FR | 2988201 | 9/2013 |
| WO | 2017079219 | 5/2017 |
| WO | WO 2021021557 A1 * | 2/2021 ............ G05D 1/628 |
| WO | 2022051263 | 3/2022 |

OTHER PUBLICATIONS

Badue et al.; Self-Driving Cars: A Survey, Oct. 2, 2019, 34 pages.

Yi et al.; Metrics for the Evaluation of localisation Robustness, Apr. 18, 2019, 7 pages.

Meng et al; A Robust Vehicle Localization Approach Based on GNSS/IMU/DMI/LiDAR Sensor Fusion for Autonomous Vehicles, Sep. 18, 2017, 19 pages.

Thrun et al., "Probabilistic Robotics", Chapter 4.2, 492 pages.

Behley, J., & Stachniss, C. Efficient Surfel-Based SLAM Using 3D Laser Range Data in Urban Environments. Robotics: Science and Systems; (vol. 2018), 10 pages.

Demantke J., Mallet C., David N. and Vallet B., Dimensionality Based Scale Selection in 3D Lidar Point Cloud. The International Archives of the Photogrammetry, Remote Sensing and Spatial Information Sciences, XXXVIII-5/W12, 97-102, 2011, 6 pages.

United States Patent and Trademark Office, Office Action issued in U.S. Appl. No. 17/124,070 dated Jul. 21, 2022, 46 pages.

* cited by examiner

LOCALIZATION METHODS AND ARCHITECTURES FOR A TRAILER OF AN AUTONOMOUS TRACTOR-TRAILER

BACKGROUND

As computing and vehicular technologies continue to evolve, autonomy-related features have become more powerful and widely available and capable of controlling vehicles in a wider variety of circumstances. For automobiles, for example, the automotive industry has generally adopted SAE International standard J3016, which designates 6 levels of autonomy. A vehicle with no autonomy is designated as Level 0. With Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant and be capable of handling any maneuvers such as changing lanes or turning. Starting with Level 3 autonomy, a vehicle can manage most operating variables, including monitoring the surrounding environment, but an operator is still required to remain alert and take over whenever the vehicle encounters a scenario it is unable to handle. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

The present disclosure is directed to particular method(s) or architecture(s) for localization of an autonomous tractor-trailer (i.e., localization of the autonomous tractor being autonomously controlled, localization of a trailer attached to the autonomous tractor, or both). Localization of the autonomous tractor-trailer generally refers to determining a pose of the autonomous tractor-trailer within its surrounding environment and with respect to a particular frame of reference. Some implementations generate both pose instances of the autonomous tractor, trailer, or both, for use in localization of the autonomous tractor-trailer. In some of those implementations, the pose instances are utilized to control the autonomous tractor-trailer.

By using techniques described herein, one or more technical advantages can be achieved. As one non-limiting example, the techniques described herein enable pose instances of the trailer to be generated based on a portion of a LIDAR data instance that is expected to include the trailer (e.g., a sector area), and optionally based on a configuration of the trailer (e.g., a height of the trailer, a length of the trailer, etc.). As a result, a search space for identifying the trailer in the LIDAR data instance can be reduced, thereby conserving computational resources that would otherwise be wasted processing the LIDAR data instance to identify the trailer. Further, the techniques described herein enable pose instances of the trailer to be generated using particular LIDAR components beyond traditional LIDAR components (e.g., a LIDAR sensor that includes a phase coherent LIDAR component, a LIDAR sensor that includes a polarization LIDAR component). In implementations that utilize the phase coherent LIDAR component, a search space for identifying the trailer in the LIDAR data instance can also be reduced by utilizing motion-compensated point clouds that consider the fact that the LIDAR sensor is moving with the autonomous tractor-trailer, thereby conserving computational resources that would otherwise be wasted processing the LIDAR data instance to identify the trailer. In implementations that utilize the polarization LIDAR component, a search space for identifying the trailer in the LIDAR data instance can mitigate or eliminate saturated LIDAR data points (e.g., caused by certain materials in an environment of the autonomous tractor-trailer), thereby resulting in more reliable or accurate trailer pose instances.

Therefore, consistent with one aspect of the invention, a method for localization of a tractor-trailer is described herein. The method may include obtaining a Light Detection and Ranging (LIDAR) data instance of LIDAR data, the LIDAR data being generated by one or more LIDAR sensors of an autonomous tractor of the autonomous tractor-trailer; determining a sector area in an environment of the autonomous tractor-trailer that is predicted to include the trailer; determining a subset of the LIDAR data instance within the sector area that is predicted to the include the trailer; generating, based on the subset of the LIDAR data instance, a trailer pose instance, of a trailer pose of the trailer; and causing the trailer pose instance to be utilized in controlling the autonomous tractor-trailer.

These and other implementations of technology disclosed herein can optionally include one or more of the following features.

In some implementations, the method may further include obtaining a sensor data instance of sensor data. The sensor data may be generated by one or more sensors other than the one or more LIDAR sensors. Determining the sector area that is predicted to include the trailer of the autonomous tractor-trailer may include generating, based on the sensor data instance, a tractor pose instance of a tractor pose of the autonomous tractor, with respect to a local frame of reference; and determining the sector area that is predicted to include the trailer based on the tractor pose instance.

In some implementations, determining the subset of LIDAR data within the sector area that is predicted to include the trailer of the autonomous tractor-trailer may be further based on at least one preceding trailer pose instance of the trailer pose of the trailer. In some versions of those implementations, the sensor data may include one or more of: IMU data generated by one or more IMUs of the autonomous tractor-trailer, or wheel encoder data generated by one or more wheel encoders of the autonomous tractor-trailer. In additional or alternative versions of those implementations, generating the trailer pose instance may be further based on the tractor pose instance.

In some implementations, the method may further include generating, based on the subset of the LIDAR data instance, a trailer-from-tractor pose instance of a trailer-from-tractor pose of the trailer, with respect to the autonomous tractor. The trailer pose instance may be based on the trailer-from-tractor pose instance.

In some implementations, generating the trailer pose instance may be further based on trailer information corresponding to a configuration of the trailer, the configuration of the trailer representing one or more physical properties of the trailer. In some versions of those implementations, the configuration of the trailer may include one or more of: a length of the trailer, a height of the trailer, a width of the trailer, a weight distribution of the trailer, a weight of the trailer, a location of a kingpin that mechanically couples the trailer to the autonomous tractor, a distance from the kingpin to one or more rear axles of the trailer, or a location that the trailer is mechanically coupled to the tractor.

In some implementations, the one or more LIDAR sensors may include at least one phase coherent LIDAR sensor. The LIDAR data may include phase coherent LIDAR data, and the LIDAR data instance may be a phase coherent LIDAR data instance. In some versions of those implementations, determining the sector area that is predicted to include the trailer of the autonomous tractor-trailer may be based on corresponding instantaneous velocity measures included in the phase coherent LIDAR data instance, that correspond to the trailer.

In some implementations, the one or more LIDAR sensors may include at least one polarized LIDAR data sensor. The LIDAR data may include polarized LIDAR data, and the LIDAR data instance may be a polarized LIDAR data instance. In some versions of those implementations, determining the sector area that is predicted to include the trailer of the autonomous tractor-trailer may be based on corresponding polarization measures, included in the polarized LIDAR data instance, that correspond to the trailer.

In some implementations, determining the subset of LIDAR data that is predicted to the include the trailer may include assembling the LIDAR data instance into a LIDAR point cloud; and identifying, from the LIDAR point cloud, the subset of LIDAR data that is within the sector area that is predicted to include the trailer.

In some implementations, the method may further include obtaining a configuration of the trailer. Determining the sector area that is predicted to include the trailer of the autonomous tractor-trailer may include determining the sector area that is predicted to include the trailer based on the configuration of the trailer. In some versions of those implementations, obtaining the configuration of the trailer may include receiving user input, from a human operator associated with the autonomous tractor-trailer, that is indicative of the configuration of the trailer. In additional or alternative versions of those implementations, obtaining the configuration of the trailer may include utilizing a default configuration of the trailer stored in one or more databases.

In some implementations, the method may further include refraining from processing any LIDAR data included in the LIDAR data instance that is not identified for inclusion in the subset of the LIDAR data that is predicted to include the trailer; or discarding any LIDAR data included in the LIDAR data instance that is not identified for inclusion in the subset of the LIDAR data that is predicted to include the trailer.

In some implementations, the method may further include determining, based on the subset of the LIDAR data, whether any trailer is mechanically coupled to the autonomous tractor. In some versions of those implementations, generating the trailer pose instance may be in response to determining that the trailer is mechanically coupled to the autonomous tractor.

In some implementations, causing the trailer pose instance to be utilized in controlling the autonomous tractor-trailer may include causing the trailer pose instance to be transmitted to a planning subsystem, wherein the planning subsystem utilizes the trailer pose instance in determining one or more control strategies for controlling the autonomous tractor-trailer.

In some implementations, causing the trailer pose instance to be utilized in controlling the autonomous tractor-trailer may include causing the trailer pose instance to be transmitted to a perception subsystem, wherein the perception subsystem utilizes the trailer pose instance in perceiving the environment of the autonomous tractor-trailer.

Therefore, consistent with another aspect of the invention, a method for localization of a tractor-trailer is described herein. The method may include obtaining a phase coherent Light Detection and Ranging (LIDAR) data instance of phase coherent LIDAR data, the phase coherent LIDAR data being generated by one or more phase coherent LIDAR sensors of an autonomous tractor of the autonomous tractor-trailer; determining, based on corresponding instantaneous velocity measures included in the phase coherent LIDAR data instance, a subset of the phase coherent LIDAR data instance that corresponds to the trailer of the autonomous tractor-trailer; generating, based on the subset of the phase coherent LIDAR data instance that corresponds to the trailer, a trailer pose instance of a trailer pose of the trailer; and causing the trailer pose instance to be utilized in controlling the autonomous tractor-trailer.

These and other implementations of technology disclosed herein can optionally include one or more of the following features.

In some implementations, generating the trailer pose instance based on the subset of the phase coherent LIDAR data that corresponds to the trailer may include generating the trailer pose based on corresponding instantaneous position measures included in the subset of phase coherent LIDAR data.

Therefore, consistent with yet another aspect of the invention, a method for localization of a tractor-trailer is described herein. The method may include obtaining a polarized Light Detection and Ranging (LIDAR) data instance of polarized LIDAR data, the polarized LIDAR data being generated by one or more polarized LIDAR sensors of an autonomous tractor of the autonomous tractor-trailer; determining, based on corresponding polarization measures included in the polarized LIDAR data instance, a subset of the polarized LIDAR data instance, the subset of the polarized LIDAR data instance excluding any saturated LIDAR data; determining a further subset of polarized LIDAR data, from the subset of polarized LIDAR data, that corresponds to the trailer; generating, based on the further subset of the polarized LIDAR data that corresponds to the trailer, a trailer pose instance, of a trailer pose of the trailer; and causing the trailer pose instance to be utilized in controlling the autonomous tractor-trailer.

These and other implementations of technology disclosed herein can optionally include one or more of the following features.

In some implementations, determining the further subset of polarized LIDAR data that corresponds to the trailer may include determining a sector area in an environment of the autonomous tractor-trailer that is predicted to include the trailer; and determining the further subset of polarized LIDAR data, from the subset of polarized LIDAR data, based on the sector area that is predicted to include the trailer.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
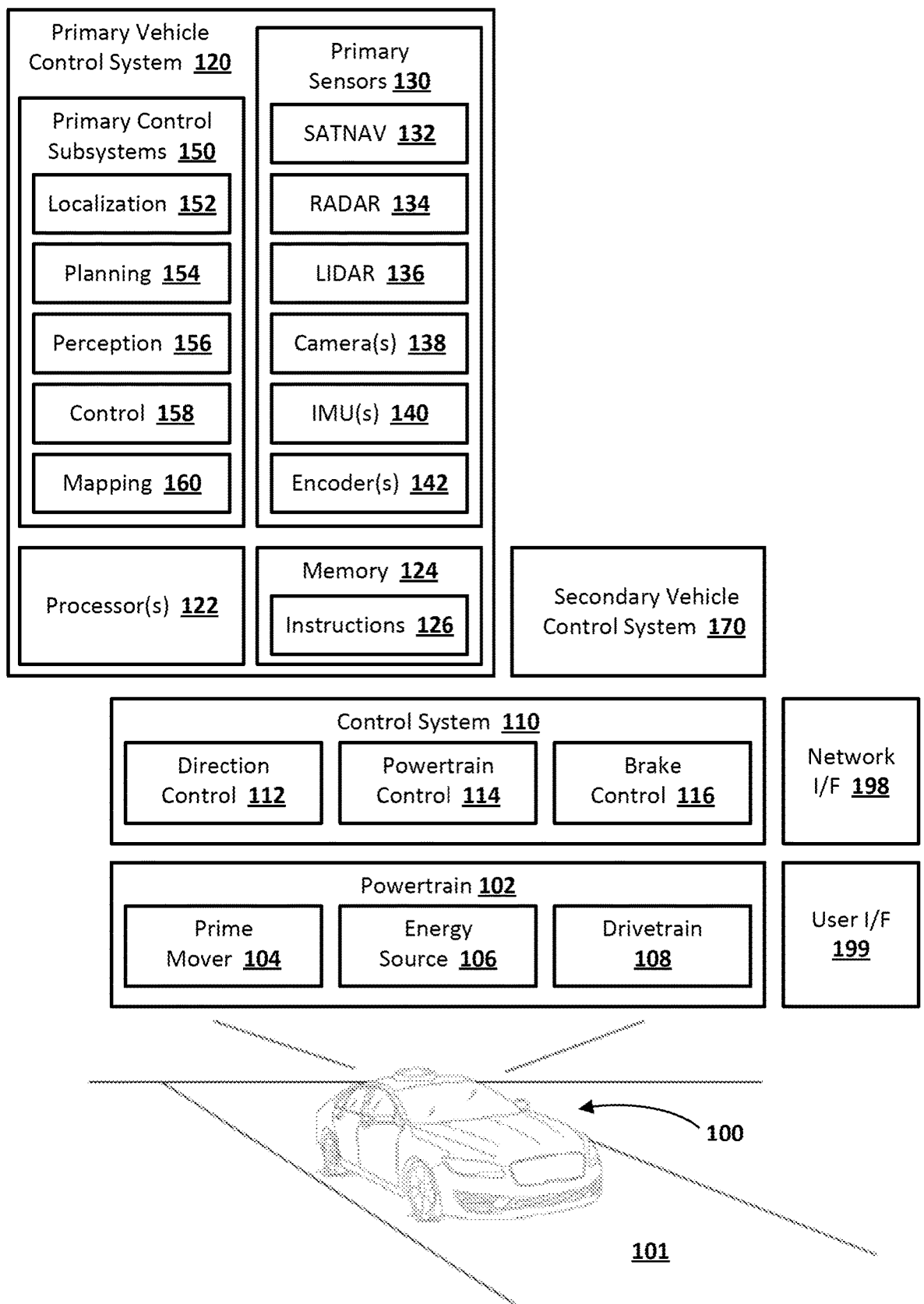
FIG. 1 illustrates an example hardware and software environment for an autonomous tractor-trailer, in accordance with various implementations.

In various implementations, localization of a trailer of an autonomous tractor-trailer is described herein. The trailer can be mechanically coupled to an autonomous tractor of the autonomous tractor-trailer. Localization of the trailer of the autonomous tractor-trailer includes generating trailer pose instances for use in localization of the trailer of the autonomous tractor-trailer. In some of those implementations, the trailer pose instances are utilized to control the autonomous tractor-trailer.

A trailer pose instance can be generated based at least in part on a tractor pose instance of the autonomous tractor. The trailer pose instance can indicate a position and orientation of the trailer with respect to a frame of reference (e.g., local frame of reference). The frame of reference for the trailer pose instance can be the same frame of reference as the tractor pose instance. As described herein, the frame of reference of the trailer pose instance and the tractor pose instance may depend on an instance of sensor data utilized in generating the tractor pose instance. In various implementations, the trailer pose instance can additionally or alternatively be generated based on a trailer-from-tractor pose instance of a trailer-from-tractor pose of the trailer. The trailer-from-tractor pose instance can indicate a position and orientation of the trailer with respect to the autonomous tractor that is distinct from the frame of reference associated with the trailer pose instance and the tractor pose instance. The trailer-from-tractor pose instance can be generated based on an instance of LIDAR data generated by LIDAR sensor(s) of the autonomous tractor-trailer, and optionally a configuration of the trailer that represents one or more physical properties of the trailer. Put another way, the instance of the LIDAR data may not be utilized in directly generating the trailer pose instance. Instead, the instance of LIDAR data may be utilized in generating the trailer-from-tractor pose instance that is utilized in generating the trailer pose instance.

In various implementations, in generating the trailer pose instance, a sector area that is predicted to include the trailer can be determined and utilized to limit processing of the instance of LIDAR data to a subset of LIDAR data that includes the trailer. In some of those implementations, the sector area can be determined based on one or more of the tractor pose instances, a steering angle of the autonomous vehicle, one or more preceding trailer pose instances, or the configuration of the trailer. Notably, the sector area that is predicted to include the trailer can be dynamically determined. For example, if the autonomous tractor travels straight, the sector area can be determined based on a subset of LIDAR data that detects surfaces directly behind the autonomous tractor where the trailer is predicted to be located in the environment. In contrast, if the autonomous tractor is turning, the sector area can be determined based on a subset of LIDAR data that detects surfaces articulated from the autonomous tractor where the trailer should be located in the environment and based on a direction that the autonomous tractor is turning. Through utilization of the sector area in generating the trailer pose instance, a search space for determining surfaces that correspond to the trailer can be reduced.

In various implementations, the LIDAR sensor(s) can include one or more particular LIDAR components. For example, in some implementations, the LIDAR sensor(s) can include a phase coherent LIDAR component. In these implementations, an instance of LIDAR data can additionally include corresponding instantaneous velocity measures and corresponding instantaneous position measures. Further, utilization of the LIDAR sensor(s) that include the phase coherent LIDAR component can obviate the need to determine the sector area referenced above since the trailer should have the same velocity as the autonomous tractor. Also, for example, in some implementations, the LIDAR sensor(s) can include a polarized LIDAR component. In these implementations, an instance of LIDAR data can additionally include corresponding polarization measures. Utilization of the LIDAR sensor(s) that include the polarized LIDAR component can result in more accurate and reliable LIDAR data by excluding any saturated LIDAR data from the subset of LIDAR data utilized in generating the trailer pose instance.

As used herein, the term tile refers to a previously mapped portion of a geographical area. A plurality of tiles can be stored in memory of various systems described herein, and the plurality of tiles can be used to represent a geographical region. For example, a given geographical region, such as a city, can be divided into a plurality of tiles (e.g., each square mile of the city, each square kilometer of the city, or other dimensions), and each of the tiles can represent a portion of the geographical region. Further, each of the tiles can be stored in database(s) that are accessible by various systems described herein, and the tiles can be indexed in the database(s) by their respective locations within the geographical region. Moreover, each of the tiles can include, for example, information contained within each of the tiles, such as intersection information, traffic light information, landmark information, street information, or other information for the geographical area represented by each of the tiles. The information contained within each of the tiles can be utilized to identify a matching tile.

As used herein, the term pose refers to location information and orientation information of an autonomous tractor-trailer within its surroundings, and generally with respect to a particular frame of reference. The pose can be an n-dimensional representation of the autonomous tractor-trailer with respect to the particular frame of reference, such any 2D, 3D, 4D, 5D, 6D, or any other dimensional representation. The frame of reference can be, for example, the aforementioned tile(s), an absolute coordinate system (e.g., longitude and latitude coordinates), a relative coordinate system (or a local frame of reference), or other frame(s) of reference. Moreover, various types of poses are described herein, and different types of poses can be defined with respect different frame(s) of reference. As used herein, the phrase pose instance refers to a corresponding pose for a corresponding instance of time, and one or more pose instances can be considered temporally corresponding pose instances if they are generated for the same corresponding instance of time.

For example, a tractor pose of an autonomous tractor-trailer can refer to location information and orientation information of an autonomous tractor of the autonomous tractor-trailer and can be generated with respect to tile(s) mentioned above or with respect to a local frame of reference. For instance, the tractor pose can be generated with respect to the tile(s) based on at least an instance of LIDAR data generated by LIDAR sensor(s) of the autonomous tractor-trailer or other instances of vision data generated by other vision sensor(s) of the autonomous tractor-trailer. Additionally, or alternatively, the tractor pose can be generated with respect to the local frame of reference based on at least an instance of sensor data generated by sensor(s) of the autonomous tractor that exclude the instances of vision data. As used herein, the phrase tractor pose instance refers to a corresponding tractor pose for a corresponding instance of time.

As another example, a trailer pose of the autonomous tractor-trailer may refer to location information and orientation information of a trailer that is mechanically coupled to an autonomous tractor of the autonomous tractor-trailer with respect to tile(s) mentioned above or with respect to a local reference frame. For instance, the trailer pose can be generated based on a temporally corresponding tractor pose. In some of those instances, the trailer pose can additionally or alternatively be generated based on trailer information associated with one or more physical properties of the trailer. In these instances, the one or more physical properties of the trailer can represent a configuration of the trailer, and can include one or more of: a length of the trailer, a height of the trailer, a width of the trailer, a weight distribution of the trailer, a weight of the trailer, a location of a kingpin that mechanically couples the trailer to the autonomous tractor, a distance from the kingpin to one or more rear axles of the trailer, or a location that the trailer is mechanically coupled to the tractor. As used herein, the phrase trailer pose instance refers to a corresponding trailer pose for a corresponding instance of time.

As yet another example, trailer-from-tractor pose can refer to location information and orientation information of a trailer that is mechanically coupled to an autonomous tractor of the autonomous tractor-trailer with respect to the autonomous tractor. For instance, the trailer-from-tractor pose can be generated with respect to the autonomous tractor based on at least an instance of LIDAR data generated by LIDAR sensor(s) of the autonomous tractor-trailer or other instances of vision data generated by other vision sensor(s) of the autonomous tractor-trailer. In instances where the trailer-from-tractor pose is generated, the trailer-from-tractor pose can additionally or alternatively be utilized in generating the trailer pose. As used herein, the phrase trailer-from-tractor pose instance refers to a corresponding trailer-from-tractor pose for a corresponding instance of time.

As used herein, the phrase instance of sensor data or the phrase sensor data instance can refer to sensor data, for a corresponding instance in time, and for one or more sensors of an autonomous vehicle. Although the sensor data instance is for a corresponding instance in time, it's not necessarily the case that all sensor data of the instance was actually generated by the sensors at the same time. For example, an instance of LIDAR data generated by LIDAR sensor(s) of the autonomous vehicle may include LIDAR data from a sensing cycle of the LIDAR sensor(s) that is generated at a first frequency, an instance of IMU data generated by IMU sensor(s) of the autonomous vehicle may include accelerometer readings and gyroscopic readings from the IMU sensor(s) that are generated at a second frequency, and an instance of wheel encoder data generated by wheel encoder(s) of the autonomous vehicle may include a quantity of accumulated ticks of revolutions of wheel(s) of the autonomous vehicle that are generated at a third frequency. Notably, the first frequency, the second frequency, and the third frequency may be distinct frequencies. Nonetheless, one or more of these can all be included in a sensor data instance based on, for example, being most recently generated relative to the instance in time. In some implementations, the phrase instance of sensor data or the phrase sensor data instance can also refer to sensor data, for a corresponding instance in time that has been processed by one or more components. For example, one or more filtering components (e.g., a Kalman filter) can be utilized to process some or all of the sensor data, and the outputs from the filtering components can still be considered an instance of sensor data or a sensor data instance.

Prior to further discussion of these and other implementations, however, an example hardware and software environment within which the various techniques disclosed herein may be implemented will be discussed.

Turning to the drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114, and a brake control 116. Vehicle 100 may be implemented as any number of different types of vehicles, including vehicles capable of transporting people or cargo, and it will be appreciated that the aforementioned components 102-116 can vary widely based upon the type of vehicle within which these components are utilized.

The implementations described herein, for example, will focus on an autonomous, wheeled land vehicle such as a car, van, truck, bus, tractor, lorry, etc. that is capable of towing one or more trailers mechanically coupled to the autonomous, wheeled land vehicle. The one or more trailers can be capable of transporting people or cargo, and can be one of multiple disparate configurations of trailers, including, but not limited to, a box or enclosed trailer, a short double box trailer, a flatbed trailer (loaded or unloaded), a tanker trailer, a side kit trailer, a drop deck trailer, a removable gooseneck trailer, or any other configuration. Further, one or more of the trailers may or may not be articulated about one or more connection points between the autonomous, wheeled land vehicle and one or more of the trailer such as a trailer hitch or kingpin. For the sake of simplicity, these vehicles are referred to herein as an autonomous tractor-trailer that includes an autonomous tractor and optionally a trailer that may be towed by the autonomous tractor. Some non-limiting examples of an autonomous tractor-trailer are described in more detail herein (e.g., with respect to FIGS. 3A and 3B).

In such implementations, the prime mover 104 may include one or more electric motors or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels or tires along with a transmission or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In various implementations, different combinations of prime movers 104 and energy sources 106 may be used. In the case of electric/gas hybrid vehicle implementations, one or more electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

Direction control 112 may include one or more actuators or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations various components may be combined, e.g., where directional control of a vehicle is primarily handled by varying an output of one or more prime movers. Therefore, the invention is not limited to the particular application of the herein-described techniques for the autonomous, wheeled land vehicle.

In the illustrated implementation, autonomous control over vehicle 100 (that may include various degrees of autonomy as well as selectively autonomous functionality) is primarily implemented in a primary vehicle control system 120, that may include processor(s) 122 and one or more memories 124, with processor(s) 122 configured to execute program code instruction(s) 126 stored in memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. A Radio Detection and Ranging (RADAR) sensor 134 and a Light Detection and Ranging (LIDAR) sensor 136, as well as digital camera(s) 138 (that may include various types of vision components capable of capturing still or video imagery in various spectrums of light), may be used to sense stationary and moving objects within the immediate vicinity of a vehicle. Inertial measurement unit(s) (IMU(s)) 140 may include multiple gyroscopes and accelerometers capable of detection linear and rotational motion of vehicle 100 in three directions, while wheel encoder(s) 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, a control subsystem 158, and a mapping subsystem 160. Localization subsystem 152 determines a pose of vehicle 100. In some implementations, the pose can include location information and orientation information of vehicle 100. In other implementations, the pose can additionally or alternatively include velocity information or acceleration information of vehicle. In some implementations, localization subsystem 152 generates the pose of vehicle 100 with respect to a particular frame of reference. As discussed in greater detail herein, localization subsystem 152 can generate various poses of vehicle 100, or a trailer that is mechanically coupled to vehicle 100, based on sensor data output by one or more of sensors 132-142. Planning subsystem 154 plans a path of motion for vehicle 100 over a timeframe given a desired destination as well as the static and moving objects within the environment, while perception subsystem 156 detects, tracks, or identifies elements within the environment surrounding vehicle 100. Control subsystem 158 generates suitable control signals for controlling the various components of control system 110 in order to implement the planned path of the vehicle. Mapping subsystem 160 may be provided in the illustrated implementations to describe the elements within an environment and the relationships therebetween, and may be accessed by the localization, planning and perception subsystems 152-156 to obtain various information about the environment for use in performing their respective functions.

In some implementations, vehicle 100 may also include a secondary vehicle control system 170, which may be used as a redundant or backup control system for vehicle 100. In some implementations, secondary vehicle control system 170 may be capable of fully operating vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, it should be understood that an innumerable number of different architectures, including various combinations of software, hardware, circuit logic, sensors, networks, etc. may be used to implement the various components illustrated in FIG. 1. The processor(s) 122 may be implemented, for example, as a microprocessor and memory 124 may represent the random access memory (RAM) devices comprising a main storage, as well as any supplemental levels of memory, e.g., cache memories, non-volatile or backup memories (e.g., programmable or flash memories), read-only memories, etc. In addition, memory 124 may be considered to include memory storage physically located elsewhere in vehicle 100 (e.g., any cache memory in processor(s) 122), as well as any storage capacity used as a virtual memory (e.g., as stored on a mass storage device or on another computer or controller). Processor(s) 124 illustrated in FIG. 1, or entirely separate processors, may be used to implement additional functionality in vehicle 100 outside of the purposes of autonomous control (e.g., to control entertainment systems, to operate doors, lights, convenience features, and so on).

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, or a tape drive, among others. Furthermore, vehicle 100 may include a user interface 199 to enable vehicle 100 to receive a number of inputs from and generate outputs for a user or operator (e.g., using one or more displays, touchscreens, voice interfaces, gesture interfaces, buttons and other tactile controls, or other input/output devices). Otherwise, user input may be received via another computer or electronic device (e.g., via an app on a mobile device) or via a web interface (e.g., from a remote operator).

Moreover, vehicle 100 may include one or more network interfaces 198 suitable for communicating with one or more networks (e.g., a local area network (LAN), a wide area network (WAN), a wired network, a wireless network, or the Internet, among others) to permit the communication of information between various components of vehicle 100 (e.g., between powertrain 102, control system 110, primary vehicle control system 120, secondary vehicle control system 170, or other systems or components), with other vehicles, computers or electronic devices, including, for example, a central service, such as a cloud service, from which vehicle 100 receives environmental and other data for use in autonomous control thereof. For example, vehicle 100 may be in communication with a cloud-based remote vehicle system including a mapping system and a log collection system.

The processor(s) 122 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as program code. Program code typically comprises one or more instructions that are resident at various times in memory 124 or another storage device accessible by vehicle 100, and that, when read and executed by processor(s) 126, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

It will be appreciated that the collection of components illustrated in FIG. 1 for primary vehicle control system 120 are merely for the sake of example. Individual sensors may be omitted in some implementations, multiple sensors of the types illustrated in FIG. 1 may be used for redundancy or to cover different regions around a vehicle, and other types of sensors may be used. Likewise, different types or combinations of control subsystems may be used in other implementations. Further, while subsystems 152-160 are illustrated as being separate from processor(s) 122 and memory 124, respectively, it will be appreciated that in some implementations, the functionality of subsystems 152-160 may be implemented with corresponding program code instruction(s) 126 resident in memory 124 and executed by processor(s) 122 and that these subsystems 152-160 may in some instances be implemented using the same processors and memory. Subsystems 152-160 in some implementations may be implemented at least in part using various dedicated circuit logic, various processors, various field-programmable gate arrays (FPGA), various application-specific integrated circuits (ASIC), various real time controllers, and the like, and as noted above, multiple subsystems may utilize common circuitry, processors, sensors, or other components. Further, the various components in primary vehicle control system 120 may be networked in various manners.

Those skilled in the art will recognize that the exemplary environment illustrated in FIG. 1 is not intended to limit the present invention. Indeed, those skilled in the art will recognize that other alternative hardware or software environments may be used without departing from the scope of the invention.

Figure 2A:
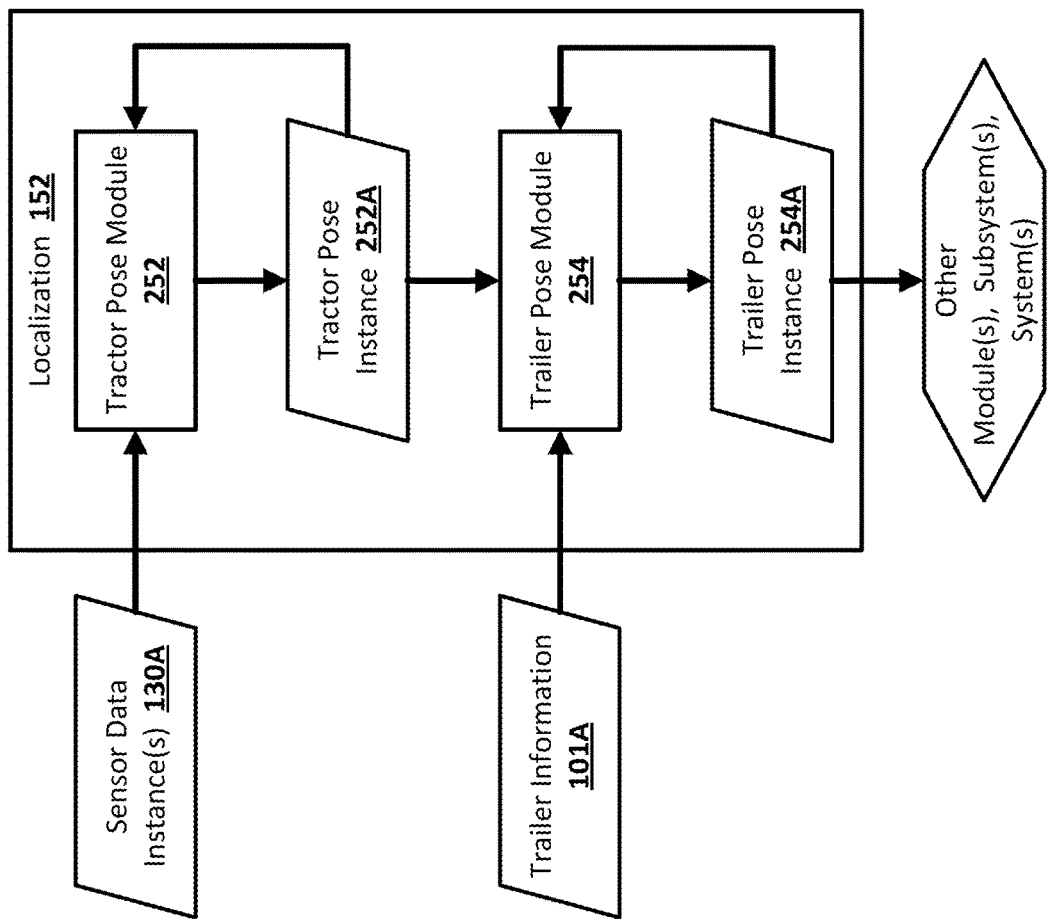
FIGS. 2A and 2B are block diagrams illustrating example implementations of the localization subsystem referenced in FIG. 1, in accordance with various implementations.
Figure 2B:
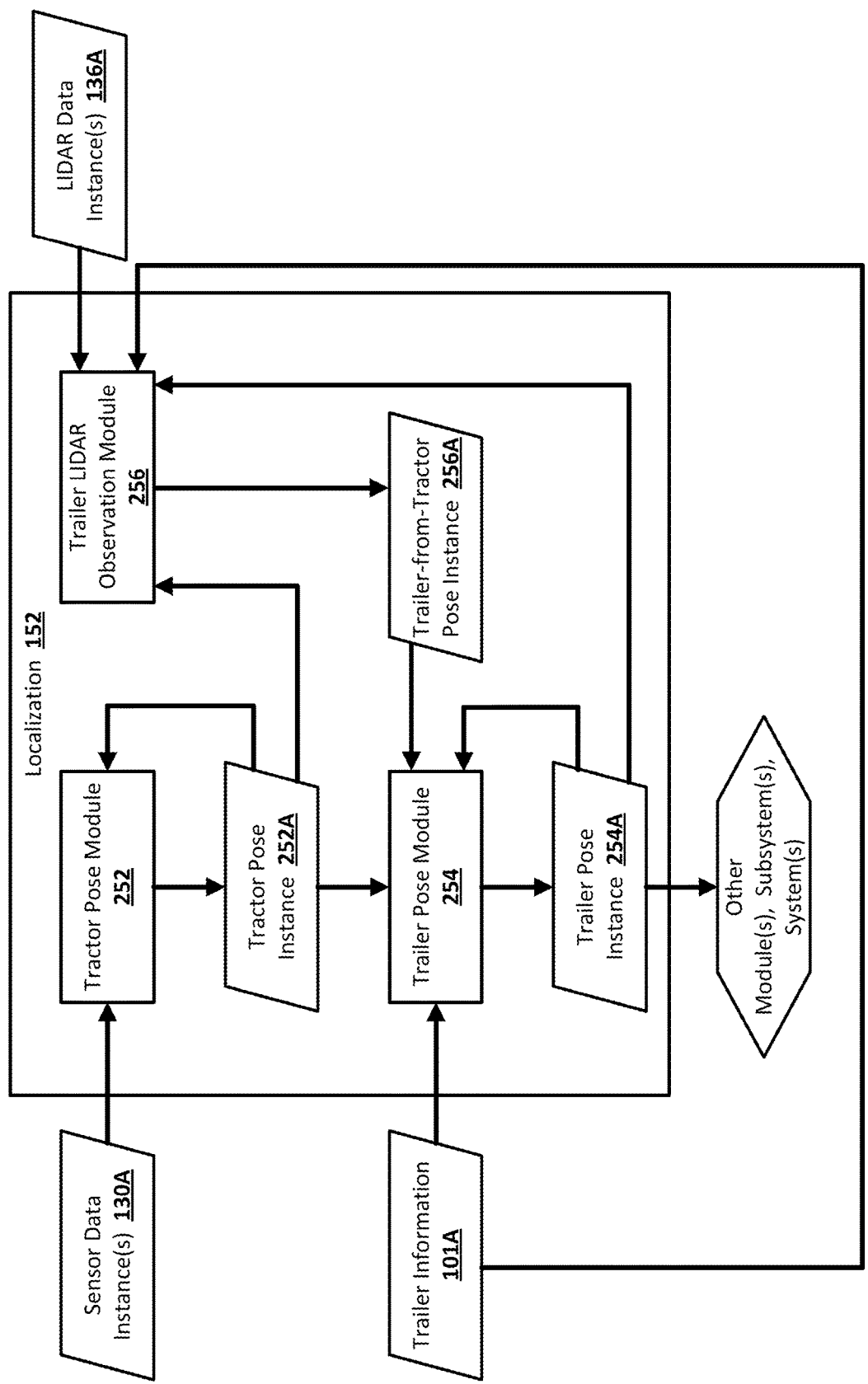

FIGS. 2A and 2B are block diagrams of the localization subsystem 152 referenced in FIG. 1, according to some implementations of the present disclosure. As noted above with respect to FIG. 1, the implementations described herein will focus on an autonomous, wheeled land vehicle such as a car, van, truck, bus, tractor, lorry, etc., that is capable of towing one or more trailers mechanically coupled to the autonomous, wheeled land vehicle. The one or more trailers may be capable of transporting people or cargo. The trailer may be a box or enclosed trailer, a short double box trailer, a flatbed trailer (loaded or unloaded), a tanker trailer, a side kit trailer, a drop deck trailer, a removable gooseneck trailer, or the like. Further, one or more of the trailers may or may not be articulated about one or more connection points between the autonomous, wheeled land vehicle and one or more of the trailer. The connection point may be a trailer hitch or kingpin, for example. For the sake of simplicity, these vehicles are referred to herein as a autonomous tractor-trailer that includes an autonomous tractor and optionally a trailer that may be towed by the autonomous tractor. Some non-limiting examples of an autonomous tractor-trailer are described in more detail herein (e.g., with respect to FIGS. 3A and 3B).

Data generated by various components of the primary vehicle control system 120 of FIG. 1 can be transmitted to various other components of the primary vehicle control system 120 of FIG. 1. For example, instances of sensor data generated by one or more sensors of the primary sensor system 130 of FIG. 1 can be received at localization subsystem 152. Also, for example, instances of one or more poses of an autonomous tractor-trailer can be transmitted from localization subsystem 142 to one or more other modules, subsystems, or systems described with respect to FIG. 1. Also, for example, trailer information associated with one or more physical properties of the trailer obtained based on information received from a user via one or more user input devices, or based on information stored in one or more databases, can be received at localization subsystem 152.

In some implementations, and referring specifically to FIG. 2A, the localization subsystem 152 of the primary vehicle control system 120 includes at least tractor pose module 252 and trailer pose module 254. The tractor pose module 252 can generate tractor pose instances of a tractor pose of an autonomous tractor of an autonomous tractor-trailer, and trailer pose module 254 can generate trailer pose instances of a trailer pose of a trailer that is mechanically coupled to the autonomous tractor. These pose instances represent position and location information of the autonomous tractor-trailer with respect to a frame of reference (e.g., tile(s), a local frame of reference, and/or other frames of reference) at a certain instance in time. These modules can use various techniques to generate the pose instances, including, but not limited to, extended Kalman filters (EKFs), nonlinear Bayesian filters, and other techniques that can utilize hauling dynamics to generate the trailer pose instance. Further, one or more of these pose instances can be subsequently utilized by one or more other modules, subsystems, or systems in controlling the autonomous tractor-trailer. For example, if the trailer of the autonomous tractor-trailer is not in a desired lane of traffic, the autonomous tractor-trailer can perform one or more actions that cause the trailer to be moved and maintained into the desired lane of traffic.

As shown in FIG. 2A, tractor pose module 252 can receive sensor data instances 130A generated by one or more sensors of the primary sensor system 130 of FIG. 1 and can generate a tractor pose instance 252A based at least in part on the sensor data instances 130A. In some implementations, a given one of the sensor data instances 130A can include, for example, an instance of LIDAR data generated by the LIDAR sensor(s) 136 of the primary sensor system 130. The tractor pose module 252 can generate a tractor pose instance 252A based on the LIDAR data. In some versions of these implementations, the tractor pose instance 252A may include position and orientation information of an autonomous tractor of the autonomous tractor-trailer with respect to tile(s). In some additional or alternative versions of these implementations, the tractor pose module 252 further generates the tractor pose instance 252A based on one or more preceding tractor pose instances.

For example, the instance of the LIDAR data can be assembled into a LIDAR point cloud, and the LIDAR point cloud can be matched to previously generated and stored point clouds associated with the tile(s) (e.g., using mapping subsystem 160) to generate the tractor pose instance 252A that includes the position and orientation information of the autonomous tractor with respect to tile(s). In some of these examples, tile(s) associated with the one or more preceding tractor pose instances (and tile(s) surrounding those tile(s)) can be utilized to narrow a search space of the tile(s) for generating the tractor pose instance 252A since the autonomous tractor-trailer can be predicted to be located in the same geographical area. In some additional or alternative versions of these implementations, the given one of the sensor data instances 130A can further include, for example, instances of one or more of IMU data generated by the IMU(s) 140 and wheel encoder data generated by the wheel encoder(s) 142 of the primary sensor system 130. The tractor pose module 252 can further generate the tractor pose instance 252A based on one or more of the IMU data or the wheel encoder data.

In some implementations, the LIDAR sensor(s) 136 can have a sensing cycle. For example, the LIDAR sensor(s) 136 can scan a certain area during a particular sensing cycle to detect an object or an environment in the area. In some versions of those implementations, a given instance of the LIDAR data can include the LIDAR data from a given sensing cycle of LIDAR sensor(s) 136. In other words, a given LIDAR data instance corresponds to, for example, a given sweep of the LIDAR sensor(s) 136 generated during the sensing cycle of the LIDAR sensor(s) 136. The LIDAR data generated during the sensing cycle of LIDAR sensor(s) 136 can include, for example, a plurality of points reflected off of a surface of an object in an environment of the autonomous tractor-trailer, and detected by at least one receiver component of the LIDAR sensor(s) 136 as data points. During a given sensing cycle, the LIDAR sensor(s) 136 can detect a plurality of data points in an area of the environment of the autonomous tractor-trailer. One or more of the data points may also be captured in subsequent sensing cycles. Accordingly, the range and velocity for a point that is indicated by the LIDAR data of a sweep of the LIDAR sensor(s) 136 can be based on multiple sensing cycle events by referencing prior (and optionally subsequent) sensing cycle events. In some versions of those implementations, multiple (e.g., all) sensing cycles can have the same duration, the same field-of-view, or the same pattern of waveform distribution (through directing of the waveform during the sensing cycle). For example, multiple sweeps can have the same duration (e.g., 50 milliseconds, 100 milliseconds, 300 milliseconds, or other durations) and the same field-of-view (e.g., 60°, 90°, 180°, 360°, or other fields-of-view).

In some versions of those implementations, multiple (e.g., all) sensing cycles can have the same duration, the same field-of-view, or the same pattern of waveform distribution (through directing of the waveform during the sensing cycle). For example, each of multiple sensing cycles that are each a sweep can have the same duration, the same field-of-view, and the same pattern of waveform distribution. However, in many other implementations the duration, field-of-view, or waveform distribution pattern can vary amongst one or more sensing cycles. For example, a first sensing cycle can be of a first duration, have a first field-of-view, and a first waveform distribution pattern; and a second sensing cycle can be of a second duration that is shorter than the first, have a second field-of-view that is a subset of the first field-of-view, and have a second waveform distribution pattern that is denser than the first.

In some implementations, the LIDAR sensor(s) 136 can include a phase coherent LIDAR component. The LIDAR data generated by the LIDAR sensor(s) 136 that include a phase coherent LIDAR component is referred to herein as phase coherent LIDAR data. In some versions of those implementations, the instances of the LIDAR data from a sensing cycle of the LIDAR sensor(s) 136 can include, for example, a transmitted encoded waveform that is sequentially directed to, and sequentially reflects off of, a plurality of points in an environment of the autonomous tractor-trailer—and reflected portions of the encoded waveform are detected, in a corresponding sensing event of the sensing cycle, by the at least one receiver of the phase coherent LIDAR component as data points. During a sensing cycle, the waveform is directed to a plurality of points in an area of the environment of the autonomous tractor-trailer, and corresponding reflections detected, without the waveform being redirected to those points in the sensing cycle. Accordingly, the range and velocity for a point that is indicated by the instance of the LIDAR data from the sensing cycle of the LIDAR sensor(s) 136 can be instantaneous in that is based on single sensing event without reference to a prior or subsequent sensing event. Frequency-modulated continuous wave (FMCW) LIDAR sensor(s) is one non-limiting example of a LIDAR sensor that includes the phase coherent LIDAR component. In these implementations, resulting LIDAR point clouds that are generated based on an instance of the LIDAR data can be motion-compensated point clouds that consider the fact that the LIDAR sensor(s) 136 are moving with the autonomous tractor-trailer, and may only include those LIDAR data points having the same velocity as the autonomous tractor-trailer.

In some additional or alternative implementations, the LIDAR sensor(s) 136 can include a polarization LIDAR component. The LIDAR data generated by the LIDAR sensor(s) 136 that include a polarized LIDAR component is referred to herein as polarized LIDAR data. In some versions of those implementations, the instances of the LIDAR data from a sensing cycle of the LIDAR sensor(s) 136 can include, for example, a linearly polarized waveform that is sequentially directed to, and sequentially reflects off of, a plurality of points in an environment of the autonomous tractor-trailer—and reflected portions of the are detected, in a corresponding sensing event of the sensing cycle, by the at least one receiver of the polarized LIDAR component as data points. Certain materials (e.g., retroreflective materials, certain metals, etc.) may be present in the environment of the autonomous tractor-trailer, and LIDAR data that detects these certain materials can be saturated. However, by using the polarized LIDAR component during the sensing cycle, the effects of this saturation can be mitigated or eliminated altogether. In some versions of those implementations, the polarized LIDAR data points that detect these certain materials can be demarcated in a first manner, whereas the polarized LIDAR data points that do not detect any of these certain materials can be demarcated in a second manner. For example, the polarized LIDAR data that detects these certain materials can be demarcated using a first color, a first size, a first shape, or another distinguishable demarcation, whereas the polarized LIDAR data that does not detect these certain materials can be demarcated using a second color, a second size, a second shape, or another distinguishable demarcation that differs from the first manner.

In other implementations, a given one of the sensor data instances 130A can include, for example, instances of one or more of IMU data generated by the IMU(s) 140 and wheel encoder data generated by the wheel encoder(s) 142 of the primary sensor system 130. The tractor pose module 252 can generate the tractor pose instance 252A based on one or more of the IMU data or the wheel encoder data. Further, the given one of the sensor data instances 130A can exclude an instance of LIDAR data generated by the LIDAR sensor(s) 136 of the primary sensor system 130. In other words, the tractor pose instance 252A may not be generated based on any vision data (e.g., LIDAR data or other vision data). In some versions of these implementations, the tractor pose instance 252A can include position and orientation information of the autonomous tractor with respect to a local frame of reference. In some additional or alternative versions of these implementations, tractor pose module 252 further generates the tractor pose instance 252A based on preceding tractor pose instances.

For example, an initial tractor pose instance can correspond to a certain point in space (e.g., X1, Y1, and Z1). In this example, a subsequent tractor pose instance can be generated with respect to this point in space. For instance, a first subsequent local pose instance can correspond to X1+X', Y1+Y', and Z1+Z', where X', Y', and Z' correspond to a positional difference of the autonomous tractor-trailer between a first time when the initial tractor pose instance was generated and a second time when the first subsequent tractor pose instance was generated. Further, an additional tractor pose instance can correspond to X'+X", Y'+Y", and Z'+Z" for the additional subsequent tractor pose instance. In some additional or alternative implementations, the particular frame of reference of the local pose instances can be a local frame of reference with respect to the tile(s). For example, an initial tractor pose instance can provide tractor pose module 252 with an indication of the tile that the autonomous tractor-trailer is located therein, and tractor pose module 252 can then generate the local pose instances relative to the tile(s). Generating the tractor pose instance 252A without utilization of any vision data can enable the tractor pose instances to be generated more frequently (e.g., at a frequency that is greater than that of vision data generation) and using less computational resources. Further, generating the tractor pose instance 252A without utilization of any vision data can enable tractor pose instances to be generated even when the vision sensor(s) generating the vision data are malfunctioning.

Further, trailer pose module 254 can receive the tractor pose instance 252A from tractor pose module 252, and generate a trailer pose instance 254A based at least in part on the tractor pose instance 252A. In some versions of these implementations, the trailer pose instance 254A can include position and orientation information of a trailer of the autonomous tractor-trailer that is mechanically coupled to the autonomous tractor. The trailer pose instance 254A can be defined with respect to the same frame of reference as the tractor pose instance 252A (e.g., tile(s) or a local frame of reference as described above) or with respect to the autonomous tractor. In some additional or alternative versions of those implementations, the trailer pose module 254 further generates the trailer pose instance 254A based on one or more preceding trailer pose instances. For example, the tractor pose instance 252A can be processed to generate the trailer pose instance 254A that includes the position and orientation information of the trailer with respect to the tile(s) or the local frame of reference associated with the tractor pose instance 252A or with respect to the autonomous tractor. In some of these examples, the frame of reference associated with the one or more preceding trailer pose instances can be utilized to narrow a search space within the frame of reference for generating the trailer pose instance 254A. The trailer pose instance 254A can be transmitted to one or more other modules, subsystems, or systems of the autonomous tractor-trailer, and can be utilized in controlling the autonomous tractor-trailer.

In some additional or alternative versions of these implementations, trailer pose module 254 further generates the trailer pose instance 254A based on trailer information 101A. The trailer information 101A can be associated with the trailer that is mechanically coupled to the autonomous tractor, and can be obtained based on information received from a user via one or more user input devices, based on information stored in one or more databases, or based on estimating the trailer information based on instances of LIDAR data (e.g., described with respect to FIGS. 3A and 3B). The trailer information 101A can correspond to a configuration of the trailer that represents one or more physical properties of the trailer, such as one or more of a length of the trailer, a height of the trailer, a width of the trailer, a weight distribution of the trailer, a weight of the trailer, a location of a kingpin that mechanically couples the trailer to the autonomous tractor, a distance from the kingpin to one or more rear axles of the trailer, a location at which the trailer is mechanically coupled to the tractor, or other physical properties of the trailer. In implementations in which the trailer information 101A is utilized in generating the trailer pose instance 254A, the trailer information 101A can be utilized to model dynamics of the trailer in generating the trailer pose instance 254A such that the trailer pose instance 254A more accurately reflects an actual pose of the trailer at a certain instance in time. In some versions of these implementations, the trailer information 101A can be default trailer information, whereas in other implementations the trailer information 101A can be provided as user input by a user (e.g., a human operator associated with the autonomous tractor-trailer) to localization subsystem 152 via one or more user interface input devices. In additional or alternative implementations, and as described with respect to FIGS. 3A and 3B, the trailer information 101A can be estimated when a trailer is initially mechanically coupled to an autonomous tractor, and optionally prior to the autonomous tractor being autonomously controlled.

In some implementations, and referring specifically to FIG. 2B, the localization subsystem 152 of primary vehicle control system 120 can further include trailer LIDAR observation module 256. In these implementations, tractor pose module 252 may generate the tractor pose instance 252A in the same or similar manner described above with respect to FIG. 2A. However, trailer pose module 254 may additionally or alternatively generate the trailer pose instance 254A based on a trailer-from-tractor pose instance 256A of a trailer-from-tractor pose of the trailer generated by trailer LIDAR observation module 256. The trailer-from-tractor pose of the trailer represents a position and location information of the trailer with respect to the autonomous tractor. In other words, the trailer-from-tractor pose of the trailer represents an orientational and translational displacement of the trailer with respect to the autonomous tractor. By additionally or alternatively generating the trailer pose instance 254A based on the trailer-from-tractor pose instance 256A, the trailer pose instance 254A can more accurately reflect an actual pose of the trailer.

In some implementations, the trailer LIDAR observation module 256 can process a given one of LIDAR data instances 136A to generate the trailer-from-tractor pose instance 256A. In some additional or alternative versions of these implementations, trailer LIDAR observation module 256 further generates the trailer-from-tractor pose instance 256A based on the tractor pose instance 252A (or one or more preceding tractor pose instances), the trailer pose instance 254A (or one or more preceding trailer pose instances), or both. In some additional or alternative versions of these implementations, trailer LIDAR observation module 256 can identify a sector area in an environment of the autonomous tractor-trailer that is predicted to include the trailer. In these implementations, trailer LIDAR observation module 256 can reduce a search space of the given one of the LIDAR data instances 136A to only the LIDAR data that is included in the identified sector area. In other words, trailer LIDAR observation module 256 may only consider LIDAR data included in the given one of the LIDAR data instances 136A that is within a certain field-of-view that is predicted to include the trailer when generating the trailer-from-tractor pose instance 256A. The sector area can be identified based on, for example, one or more of the tractor pose instance 252A (or one or more preceding tractor pose instances), a steering angle of the autonomous tractor-trailer (e.g., received at localization subsystem 152 from control system 110), a configuration of the trailer included in the trailer information 101A, or other data associated with the autonomous tractor-trailer. Identifying these sector areas and utilizing the LIDAR data included in the given one of the LIDAR data instances 136A that is within the sector area is described in more detail below (e.g., with respect to FIGS. 3A and 3B).

Trailer LIDAR observation module 256 can utilize one or more algorithms in generating the trailer-from-tractor pose instance 256A. In some implementations, the trailer LIDAR observation module 256 can pre-process the given one of the LIDAR data instances 136A to determine a subset of LIDAR data, from the given one of the LIDAR data instances 136A, that is located within the sector area that is predicted that is predicted to include the trailer. In some versions of those implementations, trailer LIDAR observation module 256 can down-sample the LIDAR data included in the sector area to reduce an amount of processing and to reduce consumption of computational resources. In some additional or alternative versions of those implementations, trailer LIDAR observation module 256 can sample one or more points along a LIDAR waveform, from the given one of the LIDAR data instances 136A, that are adjacent to a surface of the trailer, but do not touch the surface of the trailer to ensure the data processed using one or more of the algorithms accurately represents the trailer. For instance, if the autonomous tractor is driving straight and the trailer is directly behind the autonomous tractor, the given one of the LIDAR data instances 136A may not detect either side of the trailer. However, by sampling one or more points along the LIDAR waveform that are adjacent to each of the sides of the trailer, the pre-processed LIDAR data can still capture the sides of the trailer as if the LIDAR waveform did, in fact, detect the sides of the trailer.

In processing the subset of LIDAR data using one or more of the algorithms (or the pre-processed LIDAR data), a heading angle of the trailer can be determined using, for example, one or more iterations of a RANSAC algorithm, and LIDAR data points included in the subset can be aligned with one or more surfaces of the trailer to generate the trailer-from-tractor pose instance 256A. In some implementations, the trailer-from-tractor pose instance 256A can be refined prior to being provided to trailer pose module 254 using one or more Gauss-Newton iterations for the trailer-from-tractor pose 256A based on known information about the trailer. By additionally or alternatively utilizing the trailer-from-tractor pose instance 256A in generating the trailer pose instance 254A, rather than simply the tractor pose instance 252A, the trailer pose instance 254A can more accurately reflect an actual pose of the trailer of the autonomous tractor-trailer. Further, by only using the subset of LIDAR data, from the given one of the LIDAR data instances 136A, in generating the trailer-from-tractor pose instance 256A, computational resources consumed in generating both the trailer-from-tractor pose instance 256A and the trailer pose instance 254A can be reduced.

Figure 3A:
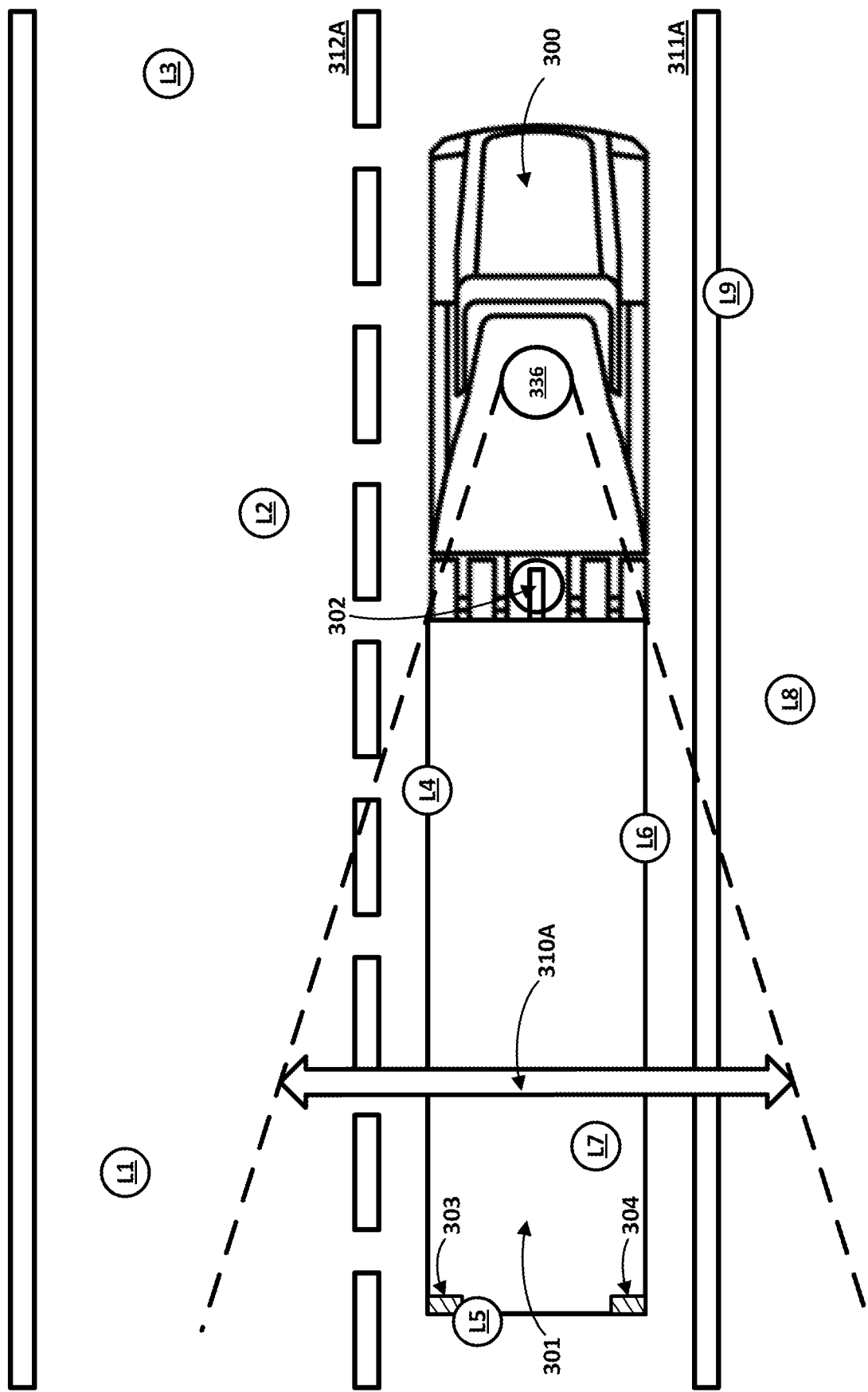
FIGS. 3A and 3B are overhead environmental views of an autonomous tractor-trailer illustrating example implementations of sector areas utilized by the localization subsystem referenced in FIG. 1, in accordance with various implementations.
Figure 3B:
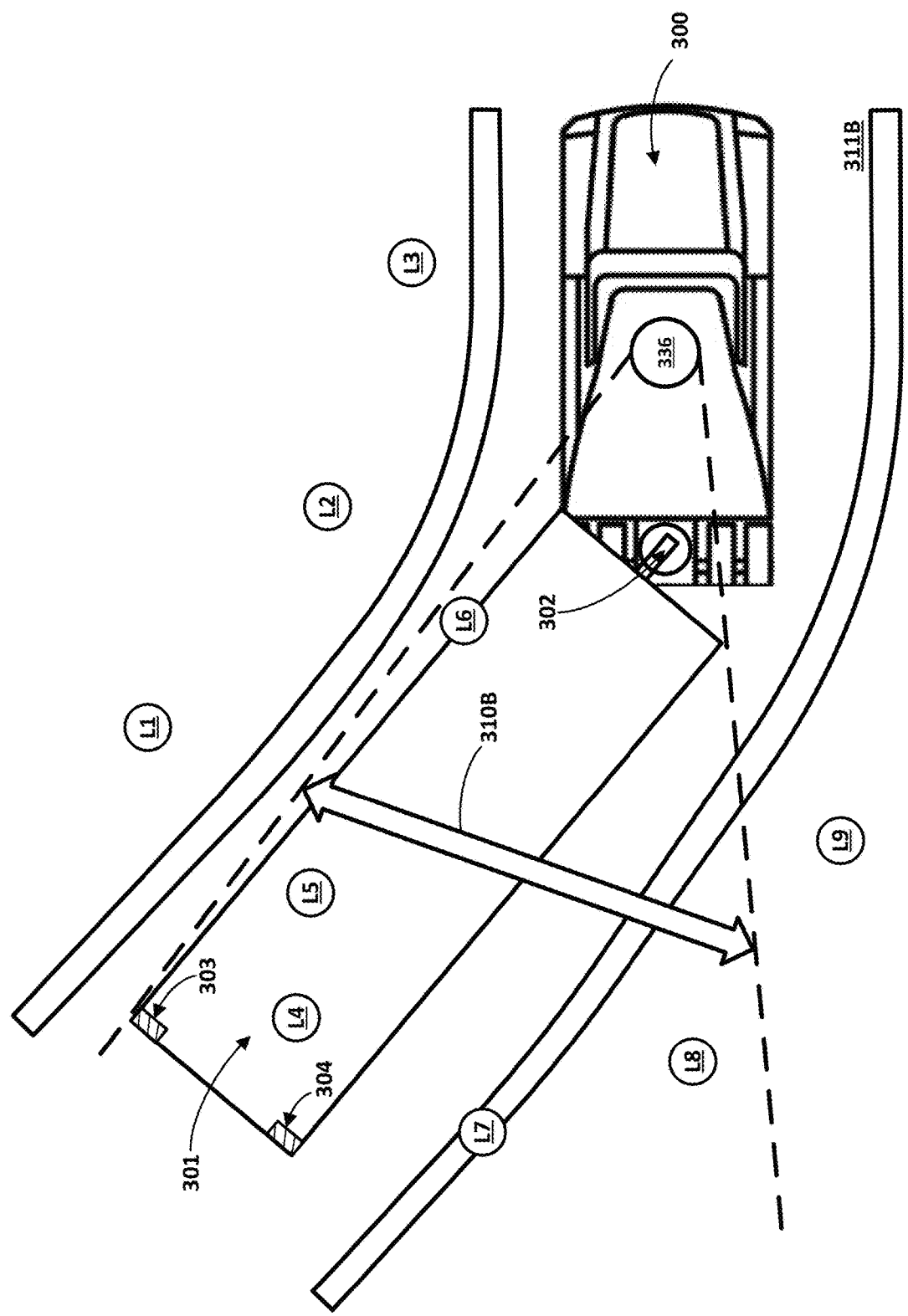

Turning now to FIGS. 3A and 3B, overhead environmental views of an autonomous tractor-trailer illustrating example implementations of sector areas utilized by the localization subsystem 152 referenced in FIG. 1 are depicted. In particular, operations described with respect to FIGS. 3A and 3B are described as being performed by trailer LIDAR observation module 256 of FIG. 2B in generating trailer-from-tractor pose instances of a trailer-from-tractor pose. As shown in FIGS. 3A and 3B, the autonomous tractor-trailer includes an autonomous tractor 300 and a trailer 301 that is mechanically coupled to the autonomous tractor 300 via a kingpin 302. In FIGS. 3A and 3B, a LIDAR sensor 336 is depicted as being mounted onto a roof of the autonomous tractor 300. Although the LIDAR sensor 336 is depicted as being mounted onto the roof of the autonomous tractor 300, it should be understood that is for the sake of example and is not meant to be limiting. Further, although the LIDAR sensor 336 is the only LIDAR sensor depicted in FIGS. 3A and 3B, it should also be understood that is for the sake of example and is not meant to be limiting. Rather, it should be understood that any number of LIDAR sensors can be mounted onto various locations of the autonomous tractor 300. For example, in various implementations, the autonomous tractor 300 can include an additional LIDAR sensor that is dedicated solely to monitoring the trailer 301. Moreover, although the trailer 301 described with respect to FIGS. 3A and 3B is not described herein as including any dedicated sensors, it should be understood that is also for the sake of example and is not meant to be limiting.

Referring specifically to FIG. 3A, assume the autonomous tractor 300 is towing the trailer 301 along a first lane 311A of a two-lane highway that also includes a second lane 312A. As the autonomous tractor 300 is towing the trailer 301 along the first lane 311A of the two-lane highway, the LIDAR sensor 336 can generate LIDAR data instances. In some implementations, for a given one of the LIDAR data instances generated by the LIDAR sensor 336, trailer LIDAR observation module 256 can determine a sector area 310A in an environment of the autonomous tractor-trailer that is predicted to include the trailer 301. The sector area 310A can take on various forms. In implementations where the autonomous tractor 300 includes an additional LIDAR sensor that is dedicated solely to monitoring the trailer 301, a field-of-view of the additional LIDAR sensor can be limited to the sector area 310A.

As depicted in FIG. 3A, the sector area 310A can correspond to a particular range of a field-of-view of the LIDAR sensor 336. For instance, assuming that the LIDAR sensor has a 360 degree field-of-view for a given sensing cycle, the sector area 310A can correspond to a portion of the field of view denoted in FIG. 3A as the sector area 310A. However, it should be understood that this is for illustrative purposes only and is not meant to be limiting. For example, the sector area 310A can correspond to a volume of voxels in the environment of the autonomous tractor-trailer that is predicted to include the trailer 301. For instance, the sector area 310A can be defined as a rectangle or cube in the environment of the autonomous tractor-trailer having a first corner of the sector area 310A that corresponds to a first point in space of $X_1, Y_1, Z_1$, a second corner of the sector area 310A corresponds to a second point in space of $X_2, Y_2, Z_2$, a third corner of the sector area 310A corresponds to a third point in space of $X_3, Y_3, Z_3$, and a fourth corner of the sector area 310A corresponds to a fourth point in space of $X_4, Y_4, Z_4$, thereby defining a height, width, and length of the sector area 310A. Also, for instance, the sector area 310A can be defined as a cylinder in the environment of the autonomous tractor-trailer having radius $R_1$ and length $L_1$, thereby defining a length and radius of the sector area 310A. In these instances, a size and shape of the sector area 310A may be based on a configuration of the trailer 310. For example, the rectangular volume of voxels described above can be utilized as the sector area 310A if the trailer 301 is a box trailer or flatbed trailer (albeit, having different heights), whereas the cylindrical volume of voxels described above can be utilized as the sector area 310A if the trailer is a tanker trailer. Accordingly, the sector area 310A can correspond to one of a plurality of disparate types of sector areas that may be based on one or more of a portion of the field-of-view of the LIDAR sensor 336 or the configuration of the trailer 301.

In some versions of those implementations, trailer LIDAR observation module 256 can determine the sector area 310A in the environment of the autonomous tractor-trailer that is predicted to include the trailer 301 based on a tractor pose instance of a tractor pose of the autonomous tractor 300. For example, trailer LIDAR observation module 256 can leverage position and orientation information of the tractor pose instance, and optionally hauling dynamics information, to determine the sector area 310A that is predicted to include the trailer 301 relative to the tractor pose instance. In these implementations, the tractor pose instance can be generated in the manner described above with respect to FIGS. 2A and 2B, and can be provided to trailer LIDAR observation module 256. As shown in FIG. 3A, the position and orientation information of the tractor pose instance may indicate that the autonomous tractor 300 is traveling straight along the first lane 311A of the two-lane highway. Accordingly, trailer LIDAR observation module 256 can determine that the sector area 310A that is predicted to include the trailer 301 is directly behind the autonomous tractor 300 based on the tractor pose instance.

In some additional or alternative versions of these implementations, trailer LIDAR observation module 256 can determine the sector area 310A in the environment of the autonomous tractor-trailer that is predicted to include the trailer 301 based on a steering angle the autonomous tractor 300. For example, trailer LIDAR observation module 256 can leverage the steering angle of the autonomous tractor 300, and optionally hauling dynamics information, to determine the sector area 310A that is predicted to include the trailer 301 relative to the steering angle of the autonomous tractor 300. In these implementations, the trailer LIDAR observation module 256 can obtain the steering angle from one or more systems of the autonomous tractor-trailer (e.g., control system 110 of FIG. 1) via a controller area network (CAN) bus. As shown in FIG. 3A, the steering angle of the autonomous tractor 300 may also indicate that the autonomous tractor 300 is traveling straight along the first lane 311A of the two-lane highway. Accordingly, trailer LIDAR observation module 256 can determine that the sector area 310A that is predicted to include the trailer 301 is directly behind the autonomous tractor 300 based on the steering angle of the autonomous tractor 300.

In some additional or alternative versions of these implementations, trailer LIDAR observation module 256 can determine the sector area 310A in the environment of the autonomous tractor-trailer that is predicted to include the trailer 301 based on one or more preceding trailer pose instances of a trailer pose of the trailer 301. For example, trailer LIDAR observation module 256 can leverage one or more of the preceding trailer pose instances, to determine the sector area 310A that is predicted to include the trailer 301 relative to one or more of the preceding trailer pose instances. In these implementations, the trailer LIDAR observation module 256 can obtain one or more of the preceding trailer pose instances, and predict where the trailer 301 should be located relative to one or more of the preceding pose instances. As shown in FIG. 3A, one or more of the preceding pose instances may indicate that the trailer 301 is directly being the autonomous tractor 300 as the autonomous tractor 300 was traveling straight along the first lane 311A of the two-lane highway. Accordingly, trailer LIDAR observation module 256 can determine that the sector area 310A that is predicted to include the trailer 301 is directly behind the autonomous tractor 300 based on one or more of the preceding trailer pose instances.

In further versions of these implementations, trailer LIDAR observation module 256 can determine the sector area 310A in the environment of the autonomous tractor-trailer that is predicted to include the trailer 301 based on a configuration of the trailer 301. For example, trailer LIDAR observation module 256 can leverage the configuration of the trailer 301 to determine the sector area 310A that is predicted to include the trailer 301 relative to the autonomous tractor 300. In some further versions of these implementations, trailer LIDAR observation module 256 can utilize a default configuration of the trailer 301 that includes a default height of the trailer 301, a default width of the trailer 301, a default length of the trailer 301, etc. In other further versions of these implementations, trailer LIDAR observation module 256 can utilize a configuration of the trailer 301 that is received from a human operator that is associated with the autonomous tractor-trailer via one or more user interface input devices. In yet other further versions of these implementations, trailer LIDAR observation module 256 can estimate a configuration of the trailer 301 prior to the autonomous tractor-trailer being autonomously controlled during a calibration stage. For example, trailer LIDAR observation module 256 can process LIDAR data instances generated by the LIDAR sensor 336 immediately after the trailer 301 is mechanically coupled to the autonomous tractor 300 to determine a length of the trailer 301, a height of the trailer 301, a width of the trailer 301, etc. As shown in FIG. 3A, the configuration of the trailer 301 can be a box trailer having a first height, a first width, and a first length, or can be a flatbed trailer having a second height, the first width, and the first height. Notably, depending on whether the trailer 301 is the box trailer or the flatbed trailer, the height of the trailer 301 can vary, and, as a result, the sector area 310A may vary. Accordingly, trailer LIDAR observation module 256 can determine that the sector area 310A that is predicted to include the trailer based on the 301 is directly behind the autonomous tractor 300 further based on the configuration of the trailer 301.

Moreover, trailer LIDAR observation module 256 can determine a subset of LIDAR data, from a given LIDAR data instance generated by the LIDAR sensor 336, based on the subset of LIDAR data being within the sector area 310A that is predicted to include the trailer 301. For example, assume the given LIDAR data instance generated by the LIDAR sensor 336 includes a plurality of LIDAR data points L1, L2, L3, L4, L5, L6, L7, L8, and L9. In this example, and assuming the sector area 310A corresponds to the portion of the field-of-view of the LIDAR sensor 336 depicted in FIG. 3A, the subset of LIDAR data can include at least LIDAR data points L4, L5, L6, and L7. Trailer LIDAR observation module 256 can limit processing of the LIDAR data, in generating a trailer-from-tractor pose instance of a trailer-from-tractor pose of the trailer 301, to the LIDAR data that is included in the subset of LIDAR data as described above with respect to FIG. 2B. In some implementations, trailer LIDAR observation module 256 can refrain from processing the other LIDAR data included in the given LIDAR data instance (e.g., LIDAR data points L1, L2, L3, L8, and L9), and can optionally discard the other LIDAR data.

In additional or alternative implementations, the LIDAR sensor 336 can include a phase coherent LIDAR component. In these implementations, trailer LIDAR observation module 256 can utilize corresponding instantaneous velocity measures associated with each of the LIDAR data points in generating the trailer-from-tractor pose instances, and optionally without determining the sector area 310A. For example, the corresponding instantaneous velocity measures associated with LIDAR data points L4, L5, L6, and L7 may have the same relative velocity as that of the autonomous tractor 300. Accordingly, in these implementations, trailer LIDAR observation module 256 can determine the subset of LIDAR data that corresponds to the trailer 301 without having to determine the sector area 310A. However, in some implementations, trailer LIDAR observation module 256 can still determine the sector area 310A to verify the LIDAR data points L4, L5, L6, and L7 do, in fact, correspond to the trailer 301.

In additional or alternative implementations, the LIDAR sensor 336 can include a polarized LIDAR component to address issues caused by certain materials in an environment of the autonomous tractor-trailer. For example, assume the trailer 301 includes metallic corners 303 and 304 at a rear end of the trailer 301. Further assume LIDAR data point L5 detects corner 303. In implementations where the LIDAR sensor 336 does not include the polarized LIDAR component, LIDAR data point L5 may be a saturated LIDAR data point caused by the metallic corner 303 (e.g., an overly bright LIDAR data point in terms of intensity). In these implementations, if the saturated LIDAR data point L5 is utilized in generating any trailer-from-tractor pose instances, the resulting trailer-from-tractor pose instances may not be reliable or accurate due to the saturation. However, in implementations where the LIDAR sensor 336 does include the polarized LIDAR component, any saturation caused by LIDAR data point L5 detecting the metallic corner 303 can be reduced or eliminated based on the polarization measures. In these implementations, trailer LIDAR observation module 256 may initially determine the subset of LIDAR data by excluding any LIDAR data points that are saturated (e.g., only consider LIDAR data points L1, L2, L3, L4, L6, L7, L8, and L9), and determine a further subset of LIDAR data, from the subset of LIDAR data, resulting in the subset of LIDAR data of L4, L6, and L7 to be utilized in generating the trailer-from-tractor pose instances.

Referring specifically to FIG. 3B, assume the autonomous tractor 300 is towing the trailer 301 along a first lane 311B of an on-ramp to a highway. Notably, as the autonomous tractor 300 is towing the trailer 301 along the first lane 311B of the on-ramp, the autonomous tractor 300 must turn left to stay in the first lane 311B of the on-ramp. As the autonomous tractor 300 veers left to stay in the first lane 311B of the on-ramp, the trailer 301 becomes articulated about the kingpin 302. The LIDAR sensor 336 can generate LIDAR data instances as the autonomous tractor 300 tows the trailer 301. In some implementations, for a given one of the LIDAR data instances generated by the LIDAR sensor 336, the trailer LIDAR observation module 256 can determine a sector area 310B in an environment of the autonomous tractor-trailer that is predicted to include the trailer 301. The sector area 310B can take on various forms as described with respect to FIG. 3A, and can be determined in the same or similar manner described with respect to FIG. 3A. However, it should be noted that the sector area 310B of FIG. 3B may differ from the sector area 310A of FIG. 3A since the trailer 301 is articulated relative to the autonomous tractor 300.

In some versions of those implementations, trailer LIDAR observation module 256 can determine the sector area 310B in the environment of the autonomous tractor-trailer that is predicted to include the trailer 301 based on a tractor pose instance of a tractor pose of the autonomous tractor 300 as described above with respect to FIG. 3A. As shown in FIG. 3B, the position and orientation information of the tractor pose instance may indicate that the autonomous tractor 300 is veering left along the first lane 311B of the on-ramp to the highway. Accordingly, trailer LIDAR observation module 256 can determine that the sector area 310B that is predicted to include the trailer 301 is behind the autonomous tractor 300 and to the right (from the perspective of looking back at the trailer 301 from the autonomous tractor 300) based on the tractor pose instance.

In some additional or alternative versions of these implementations, trailer LIDAR observation module 256 can determine the sector area 310A in the environment of the autonomous tractor-trailer that is predicted to include the trailer 301 based on a steering angle the autonomous tractor 300 as described above with respect to FIG. 3A. As shown in FIG. 3B, the steering angle of the autonomous tractor 300 may also indicate that the autonomous tractor 300 is veering left along the first lane 311B of the on-ramp to the highway. Accordingly, trailer LIDAR observation module 256 can determine that the sector area 310B that is predicted to include the trailer 301 is behind the autonomous tractor 300 and to the right (from the perspective of looking back at the trailer 301 from the autonomous tractor 300) based on the steering angle of the autonomous tractor 300.

In some additional or alternative versions of these implementations, trailer LIDAR observation module 256 can determine the sector area 310A in the environment of the autonomous tractor-trailer that is predicted to include the trailer 301 based on one or more preceding trailer pose instances of a trailer pose of the trailer 301 as described above with respect to FIG. 3A. As shown in FIG. 3B, one or more of the preceding pose instances may indicate that the trailer 301 is becoming increasingly articulated with respect to the autonomous tractor 300 as the autonomous tractor 300 is veering left along the first lane 311B of the on-ramp to the highway. Accordingly, trailer LIDAR observation module 256 can determine that the sector area 310B that is predicted to include the trailer 301 is behind the autonomous tractor 300 and to the right (from the perspective of looking back at the trailer 301 from the autonomous tractor 300) based on one or more of the preceding trailer pose instances.

Moreover, trailer LIDAR observation module 256 can determine a subset of LIDAR data, from a given LIDAR data instance generated by the LIDAR sensor 336, based on the subset of LIDAR data being within the sector area 310B that is predicted to include the trailer 301. For example, assume the given LIDAR data instance generated by the LIDAR sensor 336 includes a plurality of LIDAR data points L1, L2, L3, L4, L5, L6, L7, L8, and L9 in a similar manner described with respect to FIG. 3A. In this example, and assuming the sector area 310A corresponds to the portion of the field-of-view of the LIDAR sensor 336 depicted in FIG. 3B, the subset of LIDAR data can include at least LIDAR data points L4, L5, L6, L7, and L8. Notably, and in contrast with the sector area 310A of FIG. 3A, the sector area 310B of FIG. 3B includes a larger portion of the field-of-view of the LIDAR sensor 336 since the trailer 301 is articulated relative to the autonomous tractor 300 and includes an additional LIDAR data point. Nonetheless, trailer LIDAR observation module 256 can still limit processing of the LIDAR data, in generating a trailer-from-tractor pose instance of a trailer-from-tractor pose of the trailer 301, to the LIDAR data that is included in the subset of LIDAR data as described above with respect to FIG. 2B. In some implementations, trailer LIDAR observation module 256 can refrain from processing the other LIDAR data included in the given LIDAR data instance (e.g., LIDAR data points L1, L2, L3, and L9), and can optionally discard the other LIDAR data.

Although FIGS. 3A and 3B are described with respect to the trailer 301 having a particular configuration, it should be understood that is for the sake of example and is not meant to be limiting. Further, although FIGS. 3A and 3B are described with respect to a single trailer, it should be understood that is for the sake of example and is not meant to be limiting. As more trailers are mechanically coupled to each other and towed by the autonomous tractor 300, the additional trailers may become articulated with respect to one another. Although hauling dynamics utilized in these scenarios are more complicated, the techniques described herein can still be utilized in determining trailer pose instances of those additional trailers.

Figure 4:
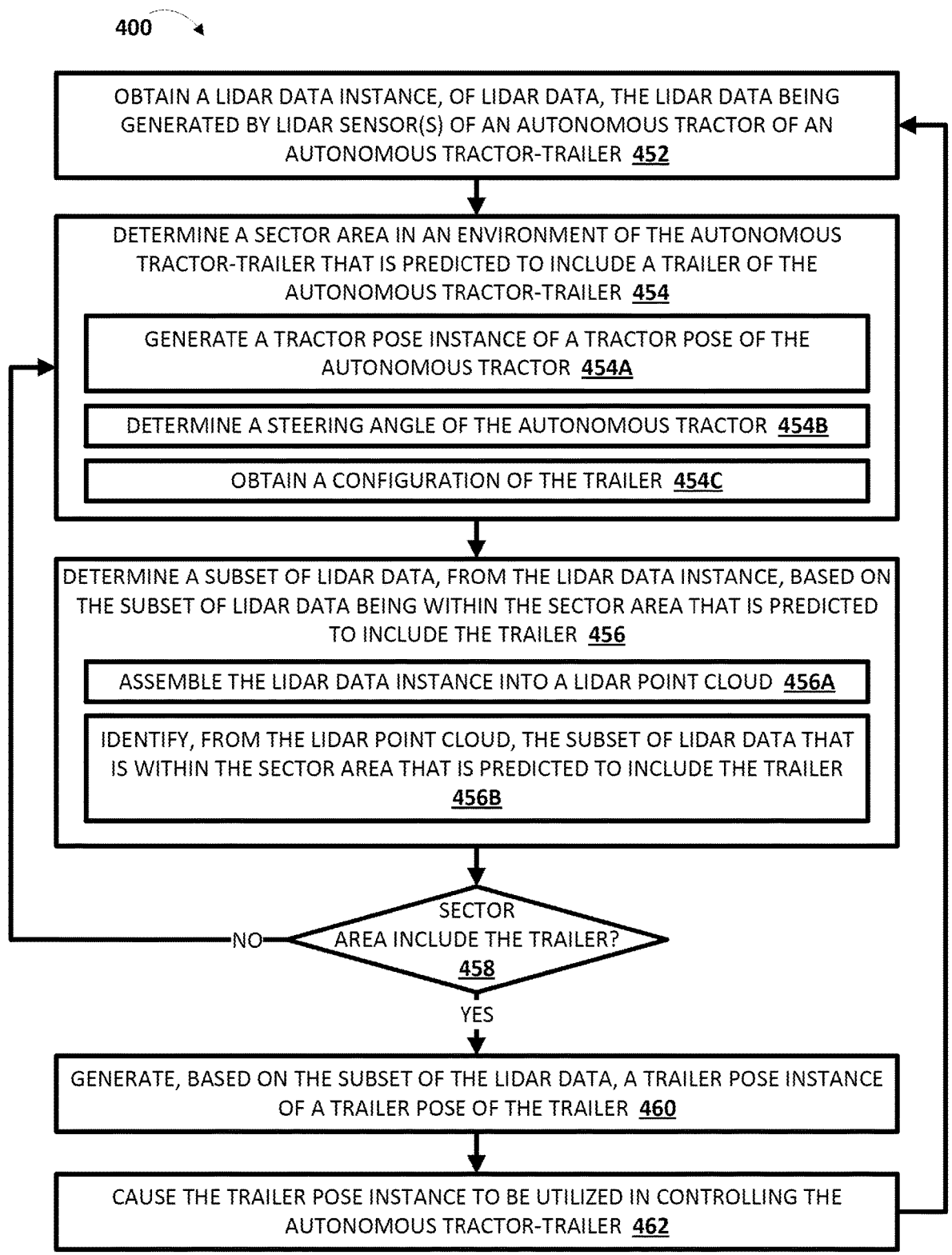
FIG. 4 is flowchart illustrating an example method for localizing of a trailer of an autonomous tractor-trailer based on LIDAR data, in accordance with various implementations.

FIG. 4 is a flow chart of an example method 400 for localizing a trailer of an autonomous tractor-trailer based on LIDAR data. The method 400 may be performed by an autonomous tractor-trailer analyzing sensor data generated by sensor(s) of the autonomous tractor-trailer (e.g., vehicle 100 of FIG. 1, autonomous tractor-trailer of FIGS. 3A and 3B, etc.), by another vehicle (autonomous or otherwise), by another computer system that is separate from the autonomous tractor-trailer, or any combination thereof. For the sake of simplicity, operations of the method 400 are described herein as being performed by a system (e.g., processor(s) 122 or primary vehicle control system 120). It will be appreciated that the operations of the method 400 may be varied, and that some operations may be performed in parallel or iteratively in some implementations, so the method 400 illustrated in FIG. 4 is merely provided for illustrative purposes.

At block 452, the system obtains a LIDAR data instance, of LIDAR data, the LIDAR data being generated by one or more LIDAR sensors of an autonomous tractor of an autonomous tractor-trailer. The LIDAR data instance can correspond to, for example, a sensing cycle of the one or more LIDAR sensors, and can include corresponding range or position measures for corresponding voxels in an environment of the autonomous tractor-trailer. Further, the one or more LIDAR sensors can be mounted onto the autonomous tractor, such as a roof of the autonomous tractor, one or more sides of the autonomous tractor, etc.

At block 454, the system determines a sector area in an environment of the autonomous tractor-trailer that is predicted to include a trailer of the autonomous tractor-trailer. The sector area can include one or more of a height, width, or length that constrains a search space for identifying the trailer. The sector area can take on various forms as described with respect to FIGS. 3A and 3B, and the sector area can be determined in various manners. In some implementations, and as indicated at sub-block 454A, the system generates a tractor pose instance of a tractor of the autonomous tractor-trailer. The system can determine the sector area that is predicted to include the trailer based on the tractor pose instance since the trailer is mechanically coupled to the autonomous tractor and is constrained by certain hauling dynamics as the trailer is towed by the autonomous tractor. In some versions of those implementations, the system generates the tractor pose instance based on the LIDAR data instance obtained at block 452. In these implementations, the tractor pose instance can include position and orientation information of the autonomous tractor with respect to one or more tiles. For example, the system can assemble the LIDAR data into a LIDAR point cloud, and can match the LIDAR point cloud to one or more previously stored point clouds that are associated with the one or more tiles. In additional or alternative versions of those implementations, the system obtains a sensor data instance of sensor data that excludes the LIDAR data, and the system generates the tractor pose instance based on the sensor data instance. The sensor data can include, for example, IMU data generated by one or more IMU sensors of the autonomous tractor, wheel encoder data generated by one or more wheel encoders of the autonomous trailer, or any other non-vision sensor data. In these implementations, the tractor pose instance can include position and orientation information of the autonomous tractor with respect to a local frame of reference. For example, the system can process the IMU data and the wheel encoder data to determine the autonomous tractor is located at a certain point in space (e.g., X1, Y1, and Z1), and can track subsequent pose instances of the autonomous tractor from this certain point space. In various implementations, the tractor pose instance can optionally be further generated based on one or more preceding tractor pose instances.

In additional or alternative implementations, and as indicated at sub-block 454B, the system determines a steering angle of the autonomous tractor (e.g., based on data generated by control system 110 of FIG. 1). Similar to the tractor pose instance as described above, the system can determine the sector area that is predicted to include the trailer based on the steering angle since the trailer is mechanically coupled to the autonomous tractor and is constrained by certain hauling dynamics as the trailer is towed by the autonomous tractor. In additional or alternative implementations, and as indicated at sub-block 454C, the system can obtain a configuration of the trailer. The configuration of the trailer can be one of multiple disparate configurations of trailers, including, but not limited to, a box or enclosed trailer, a short double box trailer, a flatbed trailer (loaded or unloaded), a tanker trailer, a side kit trailer, a drop deck trailer, a removable gooseneck trailer, or any other configuration. The configuration of the trailer can represent one or more physical properties of the trailer, such as a height of the trailer, a width of the trailer, a length of the trailer, etc. For example, a search sector for a box trailer may have a first height, whereas a search sector for a flatbed trailer may have a second height that is less than the first height associated with the box trailer.

At block 456, the system determines a subset of LIDAR data that is predicted to include the trailer. In other words, the system can identify all of the LIDAR data, from the LIDAR data instance, that is included in the sector area. In some implementations, and as indicated at sub-block 456A, the system can assemble the LIDAR data instance into a LIDAR point cloud. Further, and as indicated at sub-block 456B, the system can identify, from the LIDAR point cloud, the subset of LIDAR data that is within the sector area that is predicted to include the trailer. In these implementations, each LIDAR data point included in the LIDAR data instance can correspond to a voxel in the environment of the autonomous tractor-trailer. For example, if the sector area corresponds to a height and width, then the system can determine the subset includes each of the LIDAR data points from the LIDAR data instance that are within voxels defined by the height and width of the sector area. As another example, if the sector area corresponds to a height, width, and length, then the system can determine the subset includes each of the LIDAR data points from the LIDAR data instance that are within voxels defined by the height, width, and length of the sector area. In some implementations, the system can refrain from further processing other LIDAR data included the LIDAR data instance that is determined to not belong to the subset and the system can optionally discard that LIDAR data.

At block 458, the system determines whether the sector area includes the trailer. For example, the system can sample one or more data points included in the subset of the LIDAR data to determine whether the sector area includes the trailer. In some implementations, if, at an iteration of block 458, the system determines the sector area does not include the trailer, the system can return to block 454 to determine an additional sector area. In determining the additional sector area, the system can increase a size of the sector area, and the system proceed through a subsequent iteration of block 456 and 458 using the additional sector area. In other implementations, if, at an iteration of block 458, the system determines the sector area does not include the trailer, the system can end the method. In these implementations, the system can infer that there is no trailer mechanically coupled to the autonomous tractor, and may not perform another iteration of the method 400 until one or more conditions are satisfied. The one or more conditions can include, for example, one or more of that the autonomous tractor-trailer is parked, the autonomous tractor-trailer is subsequently being driven after being parked, the autonomous tractor-trailer is turned off and subsequently turned back on, a predetermined period of time has lapsed since the determination at block 458, or other conditions. The system can additionally or alternatively determine that no trailer is mechanically coupled to the autonomous tractor based on sensor data generated by a kingpin sensor of the autonomous tractor that indicates whether a trailer is mechanically coupled to the autonomous tractor. The system can optionally alert a human operator associated with the autonomous tractor-trailer that there is no trailer mechanically coupled to the autonomous tractor. If, at an iteration of block 458, the system determines the sector area includes the trailer, the system can proceed to block 460.

At block 460, the system can generate, based on the subset of the LIDAR data, a trailer pose instance of a trailer pose of the trailer. The trailer pose instance can include, for example, position and orientation information of the trailer with respect to one or more tiles, a local frame of reference, or with respect to temporally corresponding tractor pose instance of a tractor pose of the autonomous tractor. The system can generate the trailer pose instance by processing the subset of the LIDAR data using, for example, an extended Kalman filters (EKFs), nonlinear Bayesian filters, and other techniques that can utilize hauling dynamics to generate the trailer pose instance. In some implementations, the trailer pose can be further generated based on one or more preceding or temporally corresponding tractor pose instances of a tractor pose of the autonomous tractor. In some of these implementations, the trailer pose instance can be defined with respect to the same frame of reference as the tractor pose instances or a different frame of reference. In some additional or alternative implementations, the trailer pose can be further generated based on one or more preceding trailer pose instances.

At block 462, the system causes the trailer pose instance to be utilized in controlling the autonomous tractor-trailer. In some implementations, the system can cause one or more other modules, subsystems, or systems of the autonomous tractor-trailer to utilize the trailer pose instance. For example, the system can cause a planning subsystem to process the trailer pose instance to generate one or more control strategies or control commands that are utilized to control the autonomous tractor-trailer. For instance, assume the autonomous tractor-trailer is driving along a highway and the trailer inadvertently crosses a lane line into an adjacent line. In this example, the trailer pose instance may indicate that the trailer has crossed the line lane. As a result, one or more control strategies or control commands that are generated based at least in part on the trailer pose instance can cause the autonomous tractor to move in such a manner that causes the trailer to return to the lane.

Accordingly, by using the techniques described herein with respect to FIG. 4, the system can obtain LIDAR data instances and determine corresponding subsets of LIDAR data, from the LIDAR data instances, that are predicted to include the trailer. The system can dynamically determine the corresponding subsets of LIDAR data based on, for example, one or more of the tractor pose instances of the autonomous tractor, corresponding steering angles of the autonomous tractor, the configuration of the trailer, or one or more preceding trailer pose instances of the trailer pose of the trailer. In other words, the system can leverage one or more of information about the autonomous tractor or information about the trailer itself to predict where the trailer should be located relative to the autonomous tractor using hauling dynamics of the trailer as constraints in making these predictions. Notably, the corresponding sector areas that are predicted to include the trailer can be determined without processing the LIDAR data instances to directly determine whether they include the trailer. Further, the system can process at least LIDAR data included in the determined corresponding subsets of LIDAR data to generate corresponding trailer pose instances, and refrain from processing any other LIDAR data from the LIDAR data instances (e.g., that is not included in the corresponding subsets of LIDAR data) and optionally discard the other LIDAR data from the LIDAR data instances. As a result, the trailer pose instances can be generated in a quicker and more efficient manner since the search space for the trailer in the LIDAR is reduced by only processing the LIDAR data included in the determined corresponding subsets of LIDAR data that are within the corresponding sector areas. Moreover, the trailer pose instances that are generated in this manner can be more reliable and accurate Although the method 400 of FIG. 4 is described with respect to LIDAR sensor(s) that lack particular components, it should be understood that is for the sake of example and is not meant to be limiting. In some implementations, the LIDAR sensor(s) may include one or more particular components. For example, and as described with respect to FIG. 5, the LIDAR sensor(s) may include a phase coherent LIDAR component. Also, for example, and as described with respect to FIG. 6, the LIDAR sensor(s) may include a polarization LIDAR component. As described below, in these implementations, corresponding measures generated by the respective LIDAR components during corresponding sensing cycles can be utilized to determine the corresponding subsets of LIDAR data that are predicted to include the trailer.

Figure 5:
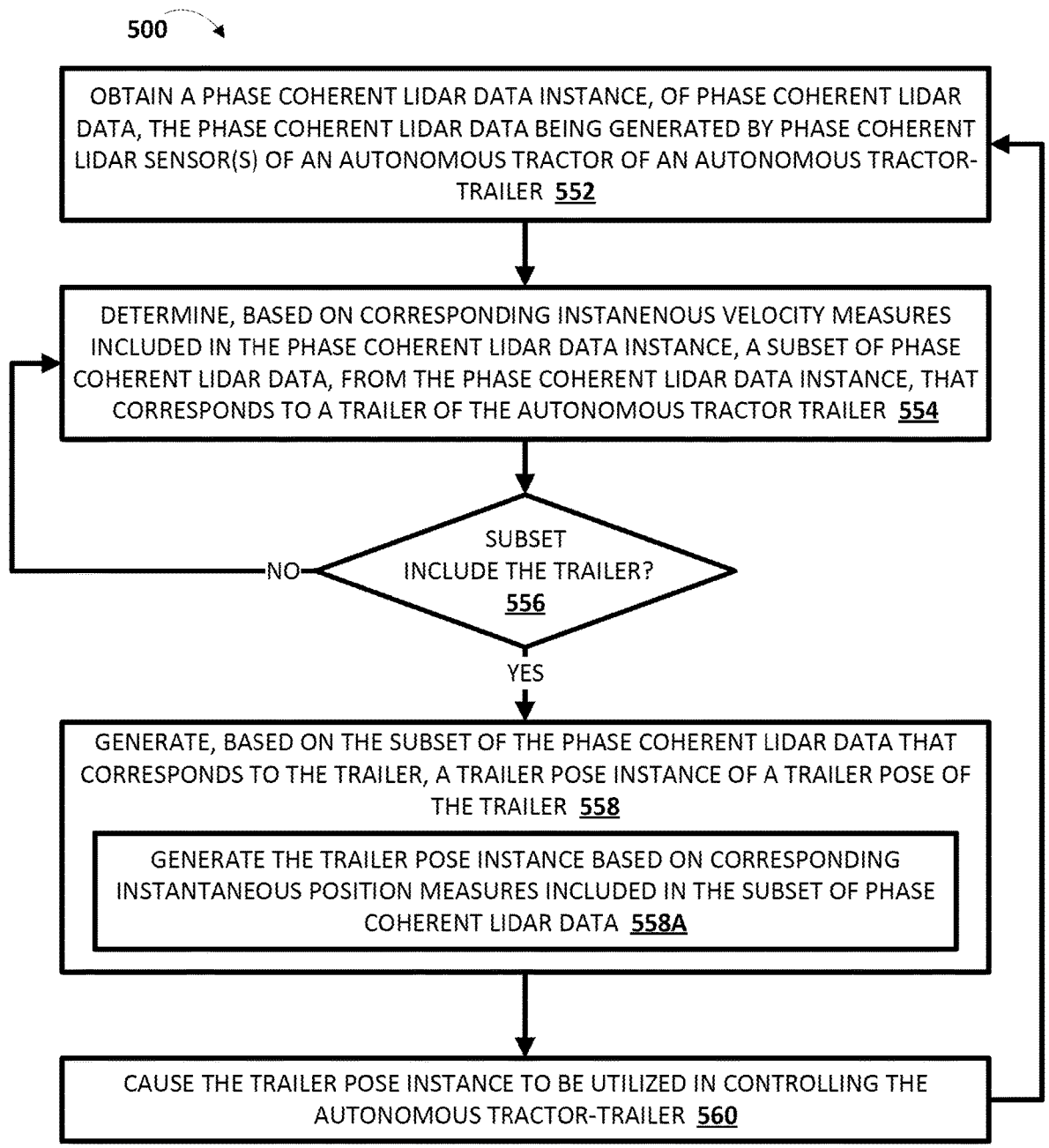
FIG. 5 is flowchart illustrating an example method for localization of a trailer of an autonomous tractor-trailer based on phase coherent LIDAR data, in accordance with various implementations.

Turning now to FIG. 5, an example method 500 for localization of a trailer of an autonomous tractor-trailer based on phase coherent LIDAR data is illustrated. The method 500 may be performed by an autonomous tractor-trailer analyzing sensor data generated by sensor(s) of the autonomous tractor-trailer (e.g., vehicle 100 of FIG. 1, autonomous tractor-trailer of FIGS. 3A and 3B, etc.), by another vehicle (autonomous or otherwise), by another computer system that is separate from the autonomous tractor-trailer, or any combination thereof. For the sake of simplicity, operations of the method 500 are described herein as being performed by a system (e.g., processor(s) 122 or primary vehicle control system 120). It will be appreciated that the operations of the method 500 may be varied, and that some operations may be performed in parallel or iteratively in some implementations, so the method 500 illustrated in FIG. 5 is merely provided for illustrative purposes.

At block 552, the system obtains a phase coherent LIDAR data instance, of phase coherent LIDAR data, the phase coherent LIDAR data being generated by one or more LIDAR sensors of an autonomous tractor of an autonomous tractor-trailer. The phase coherent LIDAR data instance can correspond to, for example, a sensing cycle of the one or more phase coherent LIDAR sensors, and can include one or more of corresponding instantaneous position measures or corresponding instantaneous velocity measures for corresponding voxels in an environment of the autonomous tractor-trailer. Further, the one or more phase coherent LIDAR sensors can be mounted onto the autonomous tractor, such as a roof of the autonomous tractor, one or more sides of the autonomous tractor, etc.

At block 554, the system determines, based on corresponding instantaneous velocity measures included in the phase coherent LIDAR data instance, a subset of phase coherent LIDAR data, from the phase coherent LIDAR data instance, that corresponds to the trailer. As noted, the system can determine the subset of phase coherent LIDAR data that corresponds to the trailer based on the corresponding instantaneous velocity measures included in the phase coherent LIDAR data instance. In other words, the system can identify phase coherent LIDAR data, from the phase coherent LIDAR data instance, that has the same instantaneous velocity relative to the autonomous tractor onto which the phase coherent LIDAR sensor(s) are mounted. In some implementations, in determining the subset of phase coherent data, the system may additionally or alternatively determine a sector area that is predicted to include the trailer as described with respect to block 454 of FIG. 4. In these implementations, the system can utilize the sector area to restrict a search space for the trailer. As a result, the system can filter output LIDAR data points that may correspond to a vehicle travelling at the same velocity as the autonomous tractor-trailer (e.g., in an adjacent lane to the autonomous tractor-trailer, behind the autonomous tractor-trailer, etc.). However, in implementations that utilize phase coherent LIDAR sensor(s) that include a phase coherent LIDAR component, the system may not determine the sector area since the corresponding instantaneous velocity measures can be indicative of the trailer.

At block 556, the system determines whether the subset of phase coherent LIDAR data includes the trailer. To determine whether the subset of phase coherent LIDAR data includes the trailer, the system can evaluate the corresponding instantaneous velocity measures included in the subset of phase coherent LIDAR data to verify the corresponding instantaneous velocity measures are, in fact, indicative of the trailer. In some implementations, the system can evaluate the corresponding instantaneous velocity measures included in the subset of phase coherent LIDAR data with respect to a configuration of the trailer. For example, assume the configuration of the trailer indicates a box trailer is mechanically coupled to the autonomous tractor. In this example, the system can determine whether the subset of phase coherent LIDAR data includes corresponding instantaneous measures at a location that corresponds to a height of the box trailer. If so, the system can determine the subset of phase coherent LIDAR data includes the trailer. However, if the subset of phase coherent LIDAR data do not include corresponding instantaneous measures at a location that corresponds to a height of the box trailer, the system can determine the subset of phase coherent LIDAR data does not include the trailer. In some implementations, if, at an iteration of block 556, the system determines the phase coherent LIDAR instance does not include the trailer, the system can return to block 554. At the subsequent iteration of block 554, the system may determine an additional subset of phase coherent LIDAR data, from the phase coherent LIDAR data instance, that includes additional phase coherent LIDAR data beyond what was determined for inclusion in the subset of phase coherent LIDAR data. In other implementations, if, at an iteration of block 556, the system determines the subset of phase coherent LIDAR data does not include the trailer, the system can end the method. In these implementations, the system can infer that there is no trailer mechanically coupled to the autonomous tractor, and may not perform another iteration of the method 500 until one or more conditions are satisfied (e.g., described with respect to block 458 of FIG. 4). The system can additionally or alternatively determine that no trailer is mechanically coupled to the autonomous tractor based on sensor data generated by a kingpin sensor of the autonomous tractor that indicates whether a trailer is mechanically coupled to the autonomous tractor. The system can optionally alert a human operator associated with the autonomous tractor-trailer that there is no trailer mechanically coupled to the autonomous tractor.

If, at an iteration of block 556, the system determines the phase coherent LIDAR instance does include the trailer, the system can proceed to block 558, and optionally discard any phase coherent LIDAR data, from the phase coherent LIDAR data instance, that is not determined for inclusion in the subset of phase coherent LIDAR data.

At block 558, the system generates, based on the subset of the phase coherent LIDAR data that corresponds to the trailer, a trailer pose instance of a trailer pose of the trailer. The trailer pose instance can include, for example, position and orientation information of the trailer with respect to one or more tiles, a local frame of reference, or with respect to temporally corresponding tractor pose instance of a tractor pose of the autonomous tractor. The system can generate the trailer pose instance by processing the subset of the phase coherent LIDAR data using, for example, an extended Kalman filters (EKFs), nonlinear Bayesian filters, and other techniques that can utilize hauling dynamics to generate the trailer pose instance. In some implementations, and as indicated at sub-block 558A, the system generates the trailer pose instance based on corresponding instantaneous position measures included in the subset of phase coherent LIDAR data. In some implementations, the trailer pose can be further generated based on one or more preceding or temporally corresponding tractor pose instances of a tractor pose of the autonomous tractor. In some of these implementations, the trailer pose instance can be defined with respect to the same frame of reference as the tractor pose instances or a different frame of reference. In some additional or alternative implementations, the trailer pose can be further generated based on one or more preceding trailer pose instances.

At block 560, the system causes the trailer pose instance to be utilized in controlling the autonomous tractor-trailer. In some implementations, the system can cause one or more other modules, subsystems, or systems of the autonomous tractor-trailer to utilize the trailer pose instance. For example, the system can cause a perception subsystem to process the trailer pose instance to perceive the environment of the autonomous tractor-trailer. For instance, assume the autonomous tractor-trailer is driving along a highway and the trailer inadvertently crosses a lane line into an adjacent line. In this example, the trailer pose instance may indicate that the trailer has crossed the line lane. As a result, the perception subsystem can transmit a signal to a planning subsystem that indicates the trailer has crossed the lane line.

Figure 6:
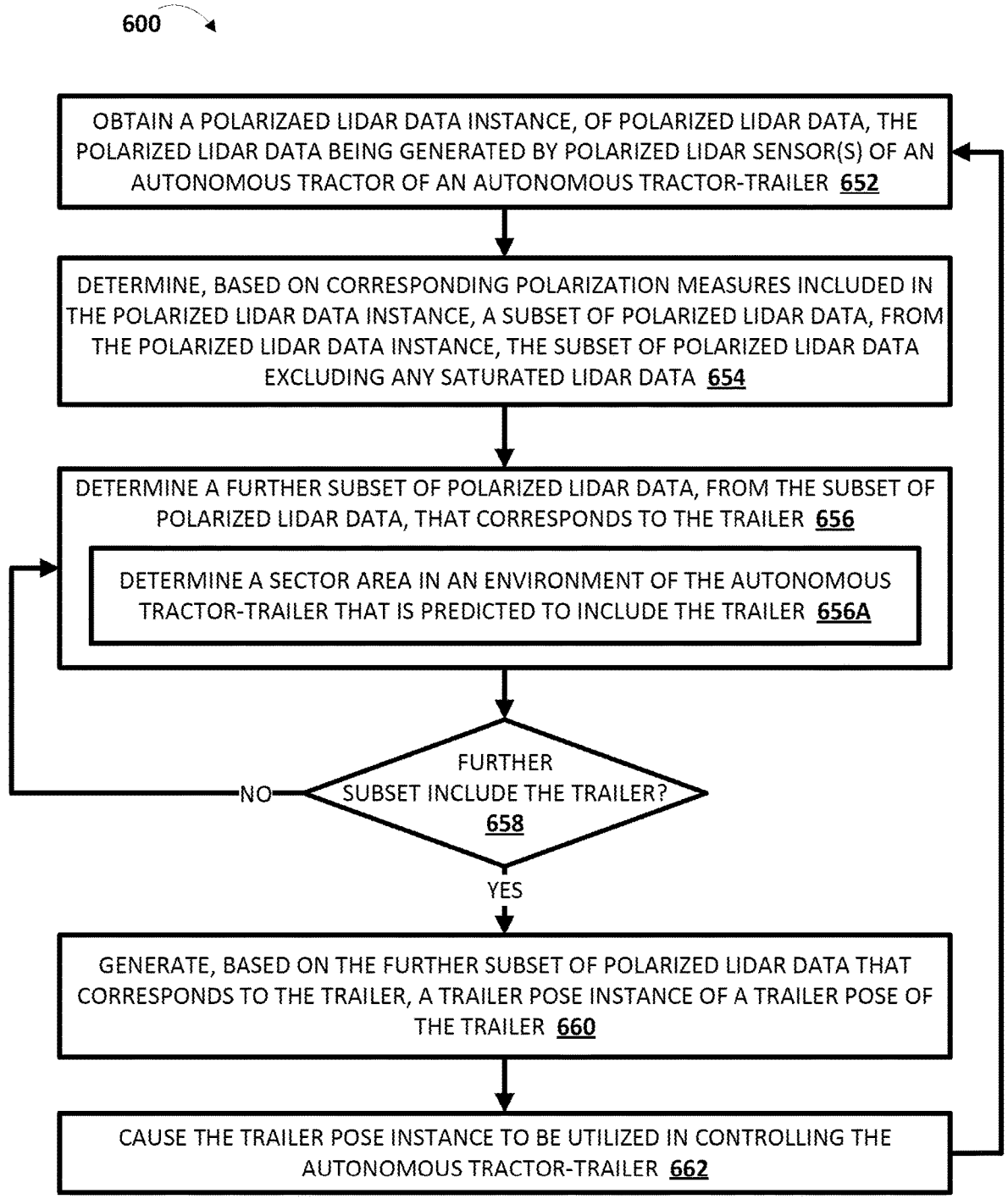
FIG. 6 is flowchart illustrating an example method for localization of a trailer of an autonomous tractor-trailer based on polarized LIDAR data, in accordance with various implementations.

Turning now to FIG. 6, an example method 600 for localization of a trailer of an autonomous tractor-trailer based on polarized LIDAR data is illustrated. The method 600 may be performed by an autonomous tractor-trailer analyzing sensor data generated by sensor(s) of the autonomous tractor-trailer (e.g., vehicle 100 of FIG. 1 autonomous tractor-trailer of FIGS. 3A and 3B, etc.), by another vehicle (autonomous or otherwise), by another computer system that is separate from the autonomous tractor-trailer, or any combination thereof. For the sake of simplicity, operations of the method 600 are described herein as being performed by a system (e.g., processor(s) 122 or primary vehicle control system 120). It will be appreciated that the operations of the method 600 may be varied, and that some operations may be performed in parallel or iteratively in some implementations, so the method 600 illustrated in FIG. 6 is merely provided for illustrative purposes.

At block 652, the system obtains a polarized LIDAR data instance, of polarized LIDAR data, the polarized LIDAR data being generated by one or more polarized LIDAR sensors of an autonomous tractor of an autonomous tractor-trailer. The polarized LIDAR data instance can correspond to, for example, a sensing cycle of the one or more phase polarized LIDAR sensors, and can include one or more of corresponding polarization measures for corresponding voxels in an environment of the autonomous tractor-trailer. Further, the one or more polarized LIDAR sensors can be mounted onto the autonomous tractor, such as a roof of the autonomous tractor, one or more sides of the autonomous tractor, etc.

At block 654, the system determines, based on corresponding polarization measures included in the polarized LIDAR data instance, a subset of polarized LIDAR data, from the polarized LIDAR data instance, the subset of polarized LIDAR data excluding any saturated LIDAR data. Certain materials (e.g., retroreflective materials, certain metals, etc.) may be present in the environment of the autonomous tractor-trailer, and LIDAR data that detects these certain materials can be saturated. However, by using the polarized LIDAR component during the sensing cycle, the effects of this saturation can be mitigated or eliminated altogether. In some versions of those implementations, the polarized LIDAR data points that detect these certain materials can be demarcated in a first manner, whereas the polarized LIDAR data points that do not detect any of these certain materials can be demarcated in a second manner. For example, the polarized LIDAR data that detects these certain materials can be demarcated using a first color, a first size, a first shape, or another distinguishable demarcation, whereas the polarized LIDAR data that does not detect these certain materials can be demarcated using a second color, a second size, a second shape, or another distinguishable demarcation that differs from the first manner. Accordingly, the subset of polarized LIDAR data can include polarized LIDAR data that excludes saturated LIDAR data.

At block 656, the system determines a further subset of polarized LIDAR data, from the subset of LIDAR data, that corresponds to the trailer. In some implementations, and as indicated at sub-block 656A, the system determines a sector area in an environment of the autonomous tractor-trailer that is predicted to include the trailer. The system can determine the sector area that is predicted to include the trailer in the same or similar manner described with respect to block 454 of FIG. 4. Notably, the subset determined at block 654 excludes any saturated LIDAR data, and the further subset determined at block 656 includes polarized LIDAR data that corresponds to the trailer includes polarized LIDAR data from the subset that specifically corresponds to the trailer.

At block 658, the system determines whether the further subset of polarized LIDAR data includes the trailer. For example, the system can sample one or more data points included in the further subset of the polarized LIDAR data to determine whether the polarized LIDAR data, included in the further subset, includes the trailer or a sector area includes the trailer. In some implementations, if, at an iteration of block 658, the system determines the further subset does not include the trailer, the system can return to block 656 to refine the further subset to include additional polarized LIDAR data points from the subset of polarized LIDAR data. In determining the additional polarized LIDAR data points, the system can increase a size of a sector area, and the system proceed through a subsequent iteration of block 658 using the refined further subset of the polarized LIDAR data. In other implementations, if, at an iteration of block 658, the system determines the further subset of the polarized LIDAR data does not include the trailer, the system can end the method. In these implementations, the system can infer that there is no trailer mechanically coupled to the autonomous tractor, and may not perform another iteration of the method 600 until one or more conditions are satisfied (e.g., described with respect to block 458 of FIG. 4). The system can additionally or alternatively determine that no trailer is mechanically coupled to the autonomous tractor based on sensor data generated by a kingpin sensor of the autonomous tractor that indicates whether a trailer is mechanically coupled to the autonomous tractor. The system can optionally alert a human operator associated with the autonomous tractor-trailer that there is no trailer mechanically coupled to the autonomous tractor. If, at an iteration of block 658, the system determines the sector area includes the trailer, the system can proceed to block 660.

At block 660, the system generates, based on the further subset of polarized LIDAR data that corresponds to the trailer, a trailer pose instance of a trailer pose of the trailer. The trailer pose instance can include, for example, position and orientation information of the trailer with respect to one or more tiles, a local frame of reference, or with respect to temporally corresponding tractor pose instance of a tractor pose of the autonomous tractor. The system can generate the trailer pose instance by processing the further subset of the polarized LIDAR data using, for example, an extended Kalman filters (EKFs), nonlinear Bayesian filters, and other techniques that can utilize hauling dynamics to generate the trailer pose instance. In some implementations, the trailer pose can be further generated based on one or more preceding or temporally corresponding tractor pose instances of a tractor pose of the autonomous tractor. In some of these implementations, the trailer pose instance can be defined with respect to the same frame of reference as the tractor pose instances or a different frame of reference. In some additional or alternative implementations, the trailer pose can be further generated based on one or more preceding trailer pose instances.

At block 662, the system causes the trailer pose instance to be utilized in controlling the autonomous tractor-trailer. In some implementations, the system can cause one or more other modules, subsystems, or systems of the autonomous tractor-trailer to utilize the trailer pose instance. For example, the system can cause a planning subsystem to process the trailer pose instance to generate one or more control strategies or control commands that are utilized to control the autonomous tractor-trailer. For instance, assume the autonomous tractor-trailer is driving along a highway and the trailer inadvertently crosses a lane line into an adjacent line. In this example, the trailer pose instance may indicate that the trailer has crossed the line lane. As a result, one or more control strategies or control commands that are generated based at least in part on the trailer pose instance can cause the autonomous tractor to move in such a manner that causes the trailer to return to the lane.

Accordingly, by using the techniques described herein with respect to FIGS. 5 and 6, the system can utilize one or more LIDAR sensors that include additional LIDAR components beyond traditional LIDAR sensors. By using these additional LIDAR components, the trailer pose instances can be generated in a quicker and more efficient manner since the search space for the trailer in the LIDAR is reduced based on corresponding measures generated using these additional LIDAR components. For example, and with respect to FIG. 5, utilization of the phase coherent LIDAR data enables the system to identify those phase coherent LIDAR data points that detect the trailer based on one or more of the corresponding instantaneous velocity measures or the corresponding instantaneous position measures, thereby allowing the system to limit processing of LIDAR data to generate the trailer pose instance to only those having one or more of the corresponding instantaneous velocity measures or the corresponding instantaneous position measures that are indicative of the trailer. Also, for example, and with respect to FIG. 6, utilization of the polarized LIDAR data enables the system to remove saturated LIDAR data caused by certain materials that may be present in the environment of the autonomous tractor-trailer, thereby allowing the system to process more clear and robust LIDAR data in generating the trailer pose instances and resulting in more accurate and reliable trailer pose instances.

Other variations will be apparent to those of ordinary skill. Therefore, the invention lies in the claims hereinafter appended.

What is claimed is:

1. A method for localization of a trailer of an autonomous tractor-trailer, the method comprising:
   obtaining a Light Detection and Ranging (LIDAR) data instance of LIDAR data, the LIDAR data being generated by one or more LIDAR sensors of an autonomous tractor of the autonomous tractor-trailer;
   determining a sector area in an environment of the autonomous tractor-trailer that is predicted to include the trailer;
   determining a subset of the LIDAR data instance within the sector area that is predicted to the include the trailer;
   generating, based on the subset of the LIDAR data instance, a trailer pose instance, of a trailer pose of the trailer; and
   causing the trailer pose instance to be utilized in controlling the autonomous tractor-trailer.

2. The method of claim 1, further comprising:
   obtaining a sensor data instance of sensor data, wherein the sensor data is generated by one or more sensors other than the one or more LIDAR sensors; and
   wherein determining the sector area that is predicted to include the trailer of the autonomous tractor-trailer comprises:
      generating, based on the sensor data instance, a tractor pose instance of a tractor pose of the autonomous tractor, with respect to a local frame of reference; and
      determining the sector area that is predicted to include the trailer based on the tractor pose instance.

3. The method of claim 1, wherein determining the subset of LIDAR data within the sector area that is predicted to include the trailer of the autonomous tractor-trailer is further based on at least one preceding trailer pose instance of the trailer pose of the trailer.

4. The method of claim 2, wherein the sensor data comprises one or more of: IMU data generated by one or more IMUs of the autonomous tractor-trailer, or wheel encoder data generated by one or more wheel encoders of the autonomous tractor-trailer.

5. The method of claim 2, wherein generating the trailer pose instance is further based on the tractor pose instance.

6. The method of claim 1, further comprising:
   generating, based on the subset of the LIDAR data instance, a trailer-from-tractor pose instance of a trailer-from-tractor pose of the trailer, with respect to the autonomous tractor; and
   wherein the trailer pose instance is based on the trailer-from-tractor pose instance.

7. The method of claim 1, wherein generating the trailer pose instance is further based on trailer information corresponding to a configuration of the trailer, the configuration of the trailer representing one or more physical properties of the trailer.

8. The method of claim 7, wherein the configuration of the trailer comprises one or more of: a length of the trailer, a height of the trailer, a width of the trailer, a weight distribution of the trailer, a weight of the trailer, a location of a kingpin that mechanically couples the trailer to the autonomous tractor, a distance from the kingpin to one or more rear axles of the trailer, or a location that the trailer is mechanically coupled to the tractor.

9. The method of claim 1, wherein the one or more LIDAR sensors comprise at least one phase coherent LIDAR sensor, wherein the LIDAR data comprises phase coherent LIDAR data, and wherein the LIDAR data instance is a phase coherent LIDAR data instance.

10. The method of claim 9, wherein determining the sector area that is predicted to include the trailer of the autonomous tractor-trailer is based on corresponding instantaneous velocity measures included in the phase coherent LIDAR data instance, that correspond to the trailer.

11. The method of claim 1, wherein the one or more LIDAR sensors comprise at least one polarized LIDAR data sensor, wherein the LIDAR data comprises polarized LIDAR data, and wherein the LIDAR data instance is a polarized LIDAR data instance.

12. The method of claim 11, wherein determining the sector area that is predicted to include the trailer of the autonomous tractor-trailer is based on corresponding polarization measures, included in the polarized LIDAR data instance, that correspond to the trailer.

13. The method of claim 1, wherein determining the subset of LIDAR data that is predicted to the include the trailer comprises:
   assembling the LIDAR data instance into a LIDAR point cloud; and
   identifying, from the LIDAR point cloud, the subset of LIDAR data that is within the sector area that is predicted to include the trailer.

14. The method of claim 1, further comprising:
   obtaining a configuration of the trailer; and
   wherein determining the sector area that is predicted to include the trailer of the autonomous tractor-trailer comprises:
      determining the sector area that is predicted to include the trailer based on the configuration of the trailer.

15. The method of claim 14, wherein obtaining the configuration of the trailer comprises:
   receiving user input, from a human operator associated with the autonomous tractor-trailer, that is indicative of the configuration of the trailer.

16. The method of claim 14, wherein obtaining the configuration of the trailer comprises:
   utilizing a default configuration of the trailer stored in one or more databases.

17. The method of claim 1, wherein causing the trailer pose instance to be utilized in controlling the autonomous tractor-trailer comprises:
   causing the trailer pose instance to be transmitted to a planning subsystem, wherein the planning subsystem utilizes the trailer pose instance in determining one or more control strategies for controlling the autonomous tractor-trailer.

18. The method of claim 1, wherein causing the trailer pose instance to be utilized in controlling the autonomous tractor-trailer comprises:
  causing the trailer pose instance to be transmitted to a perception subsystem, wherein the perception subsystem utilizes the trailer pose instance in perceiving the environment of the autonomous tractor-trailer.

19. A method for localization of a trailer of an autonomous tractor-trailer, the method comprising:
  obtaining a phase coherent Light Detection and Ranging (LIDAR) data instance of phase coherent LIDAR data, the phase coherent LIDAR data being generated by one or more phase coherent LIDAR sensors of an autonomous tractor of the autonomous tractor-trailer;
  determining, based on corresponding instantaneous velocity measures included in the phase coherent LIDAR data instance, a subset of the phase coherent LIDAR data instance that corresponds to the trailer of the autonomous tractor-trailer;
  generating, based on the subset of the phase coherent LIDAR data instance that corresponds to the trailer, a trailer pose instance of a trailer pose of the trailer; and
  causing the trailer pose instance to be utilized in controlling the autonomous tractor-trailer.

20. A method for localization of a trailer of an autonomous tractor-trailer, the method comprising:
  obtaining a polarized Light Detection and Ranging (LIDAR) data instance of polarized LIDAR data, the polarized LIDAR data being generated by one or more polarized LIDAR sensors of an autonomous tractor of the autonomous tractor-trailer;
  determining, based on corresponding polarization measures included in the polarized LIDAR data instance, a subset of the polarized LIDAR data instance, the subset of the polarized LIDAR data instance excluding any saturated LIDAR data;
  determining a further subset of polarized LIDAR data, from the subset of polarized LIDAR data, that corresponds to the trailer;
  generating, based on the further subset of the polarized LIDAR data that corresponds to the trailer, a trailer pose instance, of a trailer pose of the trailer; and
  causing the trailer pose instance to be utilized in controlling the autonomous tractor-trailer.

* * * * *